(12) United States Patent
Marathe

(10) Patent No.: US 11,561,959 B2
(45) Date of Patent: Jan. 24, 2023

(54) METHOD AND SYSTEM FOR AUTOMATIC ANOMALY DETECTION IN DATA

(71) Applicant: HUAWEI CLOUD COMPUTING TECHNOLOGIES CO., LTD., Gui Zhou Province (CN)

(72) Inventor: Arunprasad P. Marathe, Toronto (CA)

(73) Assignee: HUAWEI CLOUD COMPUTING TECHNOLOGIES CO., LTD., Shenzhen (CN)

( * ) Notice: Subject to any disclaimer, the term of this patent is extended or adjusted under 35 U.S.C. 154(b) by 597 days.

(21) Appl. No.: 16/511,759

(22) Filed: Jul. 15, 2019

(65) Prior Publication Data

US 2021/0019300 A1  Jan. 21, 2021

(51) Int. Cl.
*G06F 11/34* (2006.01)
*G06F 16/23* (2019.01)
(Continued)

(52) U.S. Cl.
CPC ...... *G06F 16/2365* (2019.01); *G06F 11/3072* (2013.01); *G06F 11/3419* (2013.01);
(Continued)

(58) Field of Classification Search
CPC ............. G06F 11/3072; G06F 11/3419; G06F 11/3409; G06F 17/18; G06F 2201/835; G06F 11/3452
See application file for complete search history.

(56) References Cited

U.S. PATENT DOCUMENTS 7,739,211 B2   6/2010   Coffman et al.
8,949,674 B2   2/2015   Mancoridis et al.
(Continued)

FOREIGN PATENT DOCUMENTS

CN   104683137 A   6/2015
CN   105302848 A   2/2016
(Continued)

OTHER PUBLICATIONS

Basu, S., & Meckesheimer, M. (2007). Automatic outlier detection for time series: an application to sensor data. Knowledge and Information Systems, 137-154.
(Continued)

*Primary Examiner* — Yolanda L Wilson

(57) ABSTRACT

A method and system for detecting anomaly transition point candidates in performance metadata. The method can be applied to computer system performance monitoring. Anomaly candidates, indicative of a possible transition, of a process generating the performance metadata, to or from an anomalous behavior mode are identified, for example by comparing z-scores to the left and right of various time-stamps and identifying anomaly candidates when the z-scores are significantly different. Anomaly candidates occur singularly rather than as pairs of endpoints of an anomaly interval. For at least one of the anomaly candidates, an explanatory predicate, indicative of a human-readable explanation of behavior of the process, can be generated. The set of anomalies can then be filtered, for example by removing those without explanatory predicates or replacing clusters of anomalies with a most relevant anomaly.

22 Claims, 14 Drawing Sheets

(51) Int. Cl.
*G06F 11/30* (2006.01)
*G06F 17/18* (2006.01)

(52) U.S. Cl.
CPC .......... *G06F 11/3452* (2013.01); *G06F 17/18* (2013.01); *G06F 2201/835* (2013.01)

(56) References Cited

U.S. PATENT DOCUMENTS

| | | |
|---|---|---|
| 9,063,226 B2 | 6/2015 | Zheng et al. |
| 9,326,698 B2 | 5/2016 | Blanco et al. |
| 9,609,011 B2 | 3/2017 | Muddu et al. |
| 9,643,019 B2 | 5/2017 | Higgins et al. |
| 9,679,243 B2 | 6/2017 | Zou et al. |
| 9,727,821 B2 | 8/2017 | Lin et al. |
| 9,996,694 B2 | 6/2018 | Sethumadhavan et al. |
| 10,038,707 B2 | 7/2018 | Muddu et al. |
| 10,042,697 B2 | 8/2018 | Ahad |
| 10,135,863 B2 | 11/2018 | Dennison et al. |
| 10,187,326 B1* | 1/2019 | Anand .................... H04L 43/08 |
| 2015/0088585 A1 | 3/2015 | Civil et al. |
| 2017/0192872 A1* | 7/2017 | Awad ................. G06K 9/6284 |
| 2018/0046599 A1* | 2/2018 | Nagarajan ................ G06N 3/08 |
| 2019/0004923 A1* | 1/2019 | Ariga ................. G06F 11/3419 |
| 2019/0042391 A1* | 2/2019 | Menon ............... G06F 11/3428 |
| 2019/0065302 A1* | 2/2019 | Cosgrove ................ G06F 11/34 |
| 2019/0163550 A1* | 5/2019 | Harutyunyan ...... G06F 11/0793 |
| 2019/0340096 A1* | 11/2019 | Kucherov ........... G06F 11/3452 |
| 2019/0391901 A1* | 12/2019 | Gupta ................. G06F 11/0751 |
| 2020/0104233 A1* | 4/2020 | Gaber ................ G06F 11/0751 |
| 2020/0174902 A1* | 6/2020 | Buda .................... G06F 11/079 |
| 2021/0026747 A1* | 1/2021 | Garion ............... G06F 11/3055 |

FOREIGN PATENT DOCUMENTS

| | | |
|---|---|---|
| CN | 105548764 A | 5/2016 |
| CN | 105574284 A | 5/2016 |
| CN | 105975737 A | 9/2016 |

OTHER PUBLICATIONS

Chandola, V., Banerjee, A., & Kumar, V. (2009). Anomaly detection: a survey. ACM Computing Surveys, 15:1 to 15:58.

Mozafari, B., Curino, C., Jindal, A., & Madden, S. (2013). Performance and resource modeling in highly-concurrent OLTP workloads. SIGMOD 2013, (pp. 301-312).

Yoon, D., Niu, N., & Mozafari, B. (2016). DBSherlock: A performance diagnostic tool for transactional databases. SIGMOD 2016, (pp. 1599-1614).

Dynatrace. (2019). Dynatrace home page. Retrieved from Dynatrace home page: https://www.dynatrace.com/.

Elastic. (2019). Elastic home page. Retrieved from Elastic home page: https://www.elastic.co/.

* cited by examiner

500

510 At Each Anomaly Transition Point / Candidate: Determine Percent Change of Mean Values between L and R Windows; Determine Whether Percent Change is Positive or Negative

520 At Each Anomaly Transition Point / Candidate:
(Optionally if Z-score exceeds predetermined threshold):
Generate Predicate:
"s is lower by $((\mu\_L-\mu\_R)/\mu\_L)*100$ percent" or
"s is higher by $((\mu\_L-\mu\_R)/\mu\_L)*100$ percent"

530 Repeat for Each Additional Anomaly Transition Point / Candidate

```
610 At Each Anomaly Transition Point / Candidate: Determine
Whether Any Explanatory Predicates Exist
If NO: 615 Delete Anomaly Transition Point / Candidate
```

```
620 Process Additional Anomaly Transition Points / Candidates in
Order of Increasing Timestamps:

622 Determine Whether any Prior Anomaly Transition Point /
Candidate Exists within interval of Width W
IF YES:
624 Compare Average z-score of Current and Prior Anomaly
Transition Points / Candidate
IF Current Anomaly Transition Point / Candidate has Higher z-score:
626 Replace Prior Anomaly Transition Point / Candidate with
Current Anomaly Transition Point
Otherwise:
628 Delete Current Anomaly Transition Point / Candidate
```

FIG. 6

METHOD AND SYSTEM FOR AUTOMATIC ANOMALY DETECTION IN DATA

CROSS-REFERENCE TO RELATED APPLICATIONS

This is the first application for this technology.

FIELD OF THE INVENTION

The present invention pertains to the field of automated monitoring of data, such as performance data and in particular to a method and system for automatic anomaly detection in data, such as time series performance metadata.

BACKGROUND

Computer systems in general and database management systems in particular can be monitored by collecting and processing streams of data received by such systems. The data may be time series data that indicates one or more aspects of the computer system, such as processor and memory usage. For example, the data may indicate proportions of time spent processing user data, system data, and idle time. The data may also indicate waiting times and time spent servicing one or more different types of interrupts. Such data is an example of performance metadata. The streams of data collected can contain anomalies which potentially indicate unusual conditions. Most of the time, collected data items have expected values, and in some cases, expected periodicity and frequency. Occasionally, however, something unexpected happens and data values can be far from normal with unexpected peaks and valleys, or with unexpected periods and frequencies. Some of those occurrences may be easily explainable, but others may require investigation, explanation, and eventual resolution.

Other systems, such as computer systems, weather sensors, monitoring equipment, IoT (Internet of Things), and stock ticker generators also create streams of data that can contain anomalies. Anomalies can be generally described as unexpected, unforeseen, abnormal, or deviant data values.

Because of large amount of data, and limited human capacity to process the large amount of data, a significant portion of the large amount of automatically collected data is archived, aggregated, or in some cases, simply thrown away. A domain expert can detect anomalies by observing data values and their plotted graphs. However, because of enormous amount of data, the domain expert does not have time to look at all or even a fraction of all relevant data.

Therefore there is a need for a method and system for automatic anomaly detection, for example in performance metadata, that mitigates or obviates one or more limitations in the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and system for anomaly detection in data, and anomaly reporting. The data may be performance metadata.

In accordance with an embodiment of the present invention, there is provided a method, in an electronic device, for computer system performance monitoring. The computer system may be a database management system. The method includes obtaining data indicative of usage of or more components of the computer system. The method further includes detecting one or more anomaly transition point candidates in the data. Each of the one or more anomaly transition point candidates is indicative of a possible transition, of a process of the computer system generating the data, to or from an anomalous behavior mode. Each of the anomaly transition point candidates is a standalone transition point which is unpaired with other ones of the anomaly transition point candidates. The method further includes reporting one or more of the anomaly transition point candidates as anomaly transition points.

In accordance with embodiments of the present invention, there is more generally provided a method, in an electronic device, for automatically detecting anomalies in data. The method includes detecting one or more anomaly transition point candidates in the data. Each of the one or more anomaly transition point candidates is indicative of a possible transition, of a process generating the data, to or from an anomalous behavior mode. Each of the anomaly transition point candidates is a standalone transition point which is unpaired with other ones of the anomaly transition point candidates. The method further includes reporting one or more of the anomaly transition point candidates as anomaly transition points.

Either of the above methods may further include, for at least one of the anomaly transition point candidates, generating an explanatory predicate indicative of a human-readable explanation of behavior of the process at said at least one of the anomaly transition point candidates.

In some embodiments, the data comprises a first series of values indexed in order against a corresponding series of reference values. In such embodiments, detecting the one or more anomaly transition point candidates comprises the following operations for each one of a plurality of the reference values. First, determining a first average and a first variance for a portion of the first series of values which corresponds to the reference values which lie within a predetermined interval immediately preceding said one of the plurality of reference values. Second, determining a second average and a second variance for another portion of the first series of values which corresponds to the reference values which lie within a predetermined interval immediately following said one of the plurality of reference values. Third, determining a z-score for said one of the plurality of reference values based on the first average, the second average, the first variance and the second variance, the z-score indicative of a likelihood that said one of the plurality of reference values represents one of the anomaly transition points. Fourth, identifying said one of the plurality of reference values as representing said one of the anomaly transition point candidates at least in part based on the z-score. The terms "first" "second" "third" and "fourth" do not necessarily imply an order of operations. In some embodiments, the above can be performed for multiple dimensions of data, and the results combined to determine anomaly transition points.

In accordance with another embodiment of the present invention, there is provided an electronic device for automatically detecting anomalies in data, the electronic device includes a data interface and electronic data processing hardware. The device is configured to receive the data using the data interface. The device is further configured to detect, using the electronic data processing hardware, one or more anomaly transition point candidates in the data. Each of the one or more anomaly transition point candidates is indicative of a possible transition, of a process generating the data, to or from an anomalous behavior mode. Each of the anomaly transition point candidates is a standalone transition point which is unpaired with other ones of the anomaly transition point candidates. The device is further configured to report, using the data interface or another data or user interface, one or more of the anomaly transition point candidates as anomaly transition points. The device may further be configured to: for at least one of the anomaly transition point candidates, generate, using the electronic data processing hardware, an explanatory predicate indicative of a human-readable explanation of behavior of the process at said at least one of the anomaly transition point candidates. The electronic data processing hardware may include one or both of: computer processor operatively coupled to memory; and pre-configured logic circuitry.

BRIEF DESCRIPTION OF THE FIGURES

Further features and advantages of the present invention will become apparent from the following detailed description, taken in combination with the appended drawings, in which:

FIG. 5 illustrates an explanation generation process performed as part of anomaly detection, according to embodiments of the present invention.

FIG. 6 illustrates an anomaly filtering process performed as part of anomaly detection, according to embodiments of the present invention.

It will be noted that throughout the appended drawings, like features are identified by like reference numerals.

DETAILED DESCRIPTION

Figure 1:
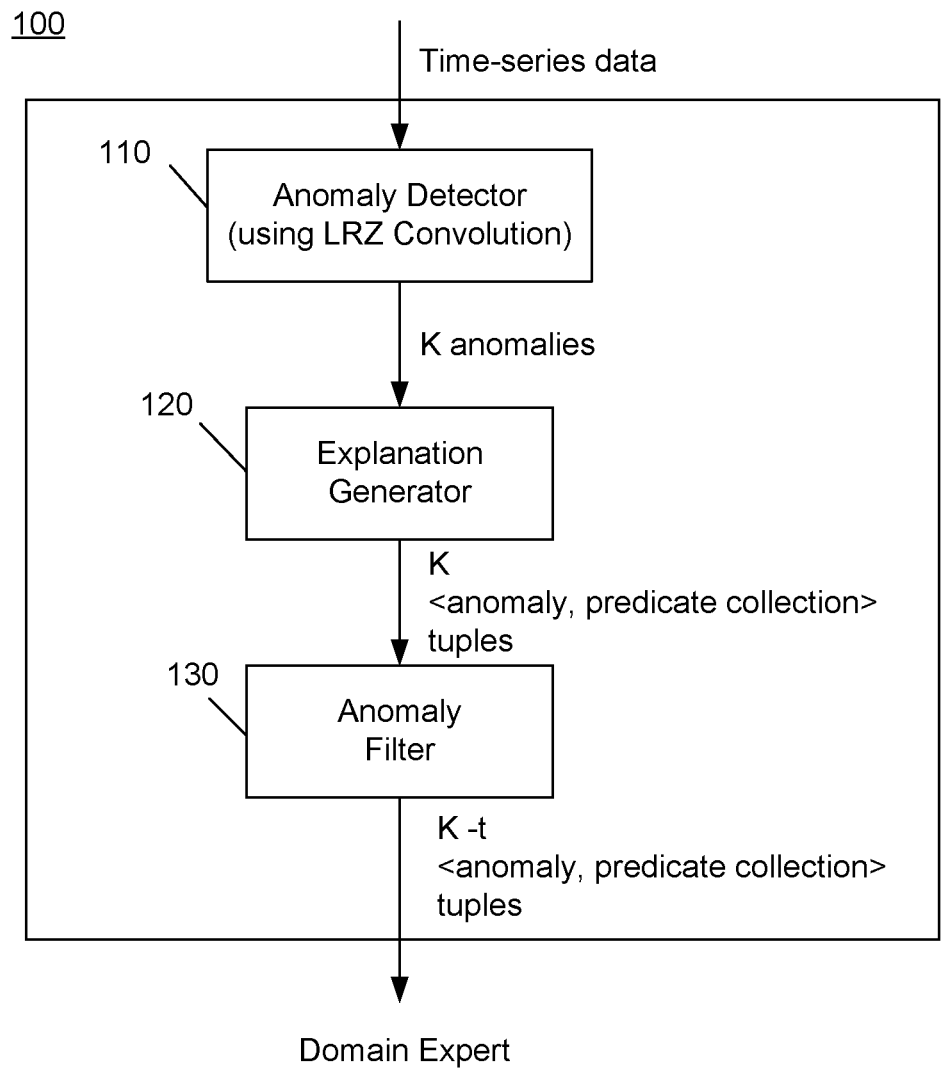
FIG. 1 schematically illustrates an anomaly detection system according to an embodiment of the present invention.

An automatic anomaly detection software can be used as a tool to detect anomalies in data, such as performance metadata, for example in order to assist human operators. For example, a human operator can analyze automatically detected anomalies before the underlying data is archived or thrown away. The anomalies can indicate underlying process changes or events of interest, which may require further investigation, accommodation or correction.

Anomalies can arise because the underlying system of the data domain undergoes changes. This can be referred to as the process generating the data undergoing a transition to or from an anomalous behavior mode. Some of these changes are normal and expected, but others are not. According to the present invention, indications of anomalies are automatically generated, and then these indications are accompanied by explanations or further information. This further information can be used to simplify a user's (e.g. an operator's or domain expert's) task. For example, based on explanations, a domain expert may choose to investigate selected ones of the anomalies. Explanations may also increase chances of an anomaly's eventual resolution, for example because the explanations provide a starting point for the investigation. One important aspect of eventual resolution is to find an anomaly's root-causes. Automatically provided explanations may be used to facilitate this activity.

If there are too many indications of anomalies, a domain expert may have no other recourse than to start ignoring them, especially if many of them turn out to be false-positive (normal data values incorrectly classified as anomalies). As such, according to embodiments of the present invention, an anomaly detection method and system can be configured to accept filtering conditions, and to adjust the number of reported anomalies based on same. Less probable anomalies may be unreported, or reported lower on a list of priorities than more probable anomalies.

Data on which an anomaly detection software operates can be of various kinds. For simplicity, a primary data type considered herein is time-series data, or data with associated time-stamps. However, other types of coordinate data can be similarly processed for anomaly detection. Each dimension of data includes a series of values (e.g. indicating percent utilization of a resource) indexed against a corresponding series of reference values, such as but not necessarily limited to timestamps (in the case of time-series data).

In contrast to definitions of anomalies as having a beginning and an end (e.g. as indicated by two time stamps), embodiments of the present invention define an anomaly as a transition point between non-anomalous and anomalous data. That is, the anomaly is defined by a single point in time (for time series data), rather than two end points. In other words, each of the anomaly transition points is a standalone transition point which is unpaired with other ones of the anomaly transition points so as to avoid requiring a transition point to be defined as the endpoint (or other relevant point) of an interval in which anomalous behaviour is deemed to occur. This definition can make automatic anomaly detection more manageable and the determination of anomaly transition points is more tractable. Consequently, operation of a computer system executing anomaly detection software is improved.

Embodiments of the present invention provide for a new perspective of viewing an anomaly not as having a duration with start and end points as has been traditionally done, but rather as consisting of one or a collection of transition points, each one between a non-anomalous and anomalous region. Procedures for identifying such anomaly transition points are also provided. In particular, as mentioned above, anomaly transition points (and candidates thereof) are identified as standalone points, rather than as endpoints of anomalous intervals (e.g. in time) in input data. Standalone points are not required to be paired with other transition points, for example as beginning and end points of an anomalous interval.

Additionally, such a definition of an anomaly more readily accommodates certain types of anomalies, such as those which have a well-defined beginning, but which dissipate gradually, and so may have no well-defined end. A second scenario that is more readily handled, with potentially less computational complexity, is that in which a second anomaly occurs while the system is still reacting to the first anomaly. In a third scenario, the anomaly is in reality a transition to a new normal, non-anomalous state.

Some other approaches to anomaly detection on timeseries data require users to explicitly mark anomalous and normal regions so that machine learning models can be trained to identify them. These approaches have a disadvantage that making such distinction may be very hard or impossible, and even if it were possible, may be infeasible due to enormous data sizes.

Anomaly explanation is considered to be a new topic. Explanation generation is becoming more important in today's world because users are inundated with data, and simply do not have time to process all of it. Automatically pre-processing the data allows for users to more appropriately focus their attention.

Rather than (or in addition to) filtering anomalies by assigning scores to same, and filtering out those anomalies having scores below particular domain-specific threshold values, some embodiments of the present invention filter anomalies based at least in part on their proximity to one another.

Embodiments of the present invention provide for a method and system for automatically detecting anomalies in data, such as time-series data. In some embodiments, the method and system also provides annotations or explanatory information (explanatory predicates) for the anomalies. In some embodiments, the method and system also provides a mechanism to filter out some of the automatically detected anomalies, for example by removing less important anomalies. The filtering may be based on a statistical score.

In some embodiments, the anomaly detection method and system is applied to a particular application domain, such as monitoring of computer system performance, or more particularly monitoring of database management system performance. This can be considered as monitoring of computer system performance metadata. When a computer is running an application, such as a database management system, or the OS, this computer may generate performance metadata. Performance metadata is indicative of computer performance aspects such as processor usage, I/O requests, memory usage, number of interrupts, etc. An anomaly in the performance metadata provides an indication of an anomaly in the performance of the computer when running the application or the OS. In other embodiments, the anomaly detection method and system is applied to one or more different application domains, such as but not necessarily limited to processing of financial data, weather data, sensor data, public or private health data, social or political data, scientific data, geological data, communications network data, etc. The output of the anomaly detection method or system can be provided in the form of a collection of automatically detected anomaly transition points, which may be sent to a domain expert for further consideration or possible action. The output may also include, for each anomaly transition point, a collection of one or more explanatory predicates. The output may comprise computer-generated text, graphics, or both. The explanatory predicates may provide information on why the anomaly occurred, or information pointing toward a root cause. The explanatory predicates may be ordered based on underlying z-scores so that the most probable discriminators are listed more prominently.

FIG. 1 schematically illustrates an anomaly detection system 100 according to an embodiment of the present invention. The system 100 includes multiple modules, including an anomaly detector 110, an explanation generator 120 and an anomaly filter 130. The anomaly filter can be omitted in some embodiments.

In some embodiments, the anomaly detection system 100 is implemented using software operating on a computer apparatus. Such a software-based system comprises computer-readable instructions which, when executed by one or more processors of a computer (e.g. a physical standalone computer or a virtual machine), performs the method of detecting anomalies in data. The system can also comprise a computer apparatus. Also provided is a computer apparatus configured to implement the anomaly detection system as described above. The system can include one or more functional modules, which are configured to perform different actions such as anomaly detection and explanation generation, as described herein.

In some embodiments, the anomaly detection system 100 is a system on chip, ASIC, or FGPA that includes up to three distinct hardware components, i.e., the anomaly detector 110, explanation generator 120 and optionally the anomaly filter 130. Alternatively, the anomaly detection system 100 may include up to three distinct systems on chip, ASICs, or FGPAs, one for each of the anomaly detector 110, explanation generator 120 and anomaly filter 130, which are controlled by a controller (not shown) of the anomaly detection system 100.

Rather than detecting anomalous regions in data, the anomaly detector 110 automatically detects candidate transition points from a normal region to an anomalous region, or vice versa. The detection may be performed using a process called "Left-window, Right-window z-score (LRZ) Convolution" (hereinafter referred to as "LRZ convolution process) that will be described elsewhere herein. The anomaly detector receives data such as time-series data (either one or multiple time-series), and produces K candidate anomalies, also referred to herein as anomaly transition point candidates. If multiple time-series data are provided, they should be aligned. K is generally a variable, and is dependent on data values and variations therein. However, a certain value or range for K can be targeted by adjusting operating parameters until the desired value or range is at least approximately reached.

The explanation generator 120 receives, from the anomaly detector 110, the K anomaly transition point candidates. For each anomaly transition point candidate, the explanation generator is configured to provide an ordered collection of likely explanations, for example provided as explanatory predicates. The collection of explanations may be ordered in the sense that more likely explanations (e.g. as determined by z-score or another statistical approach) precede less likely ones.

The anomaly filter 130 receives as input the K anomaly transition point candidates from the anomaly detector 110, and their associated explanations (e.g. collections of explanatory predicates) from the explanation generator 120. The anomaly filter 130 is configured to filter out some of the anomaly transition point candidates in a systematic manner so that K−t confirmed anomaly transition points (and their associated predicate collections) remain. In some cases, if no transition point candidates qualify for filtering, then none are filtered. The resulting data may then be stored or sent to a domain expert for possible action. The data can also be sent to another automatic process for possible automatic action. Filtering can correspond to the process of retaining some anomaly transition point candidates for possible reporting as anomaly transition points, and removing other anomaly transition point candidates.

According to various embodiments of the present invention, the automatic anomaly detection method and system operates using a statistical metric called a z-score. For example, some or all of the anomaly detector 110, explanation generator 120 and anomaly filter 130 may operate using z-scores.

According to a common definition, a z-score of a data item is a measure of how different that item is from the set of items to which it belongs. There also exists a second, less common, definition of z-score, which is the definition used primarily in the present disclosure. Consider two sets of data items each with its own mean value. According to this second definition, a z-score of the difference between the two mean values can also be calculated, and this z-score is a measure of how different the two data sets are from each other. For clarity, the term "mean-difference z-score" can be used to refer to the second definition explicitly. Although the term "mean" is used herein, other definitions of an average value can potentially be used in place of the mean, for example a median or mode.

As such, the mean-difference z-score may be indicative of a likelihood that a certain reference value or timestamp represents an anomaly transition point. Put another way, the mean-difference z-score may be indicative of a likelihood that the data in a predetermined interval immediately preceding a reference value (timestamp) is due to a different process behavior mode than the data in the predetermined interval immediately following that reference value (timestamp).

If a high mean-difference z-score value, for example being 5 or above, is observed for two compared sets of data, statistical techniques allow for a conclusion that the two sets of data (e.g. two portions of time-series data) are significantly different: one is anomalous and the other is non-anomalous. It is noted that, even if a determination is not made as to which one of the data sets is anomalous, a transition point which represents a transition either from or to an anomalous data set is still identified. This technique provides a basis for automatic anomaly detection, according to embodiments of the present invention.

In various embodiments, the same (or at least a comparable) mean-difference z-score definition is used in generating a collection of explanatory predicates for the observed anomaly transition points (or candidates). Each anomaly transition point can potentially be accompanied by one or more such predicates. Each predicate may pertain to a different data attribute. These different attributes may be referred to as different dimensions or different ones of multiple series of values. For example, for weather station data, the data attributes may include one or more of: temperature, pressure, precipitation amount, humidity, and cloud cover. As another example, for computer processor performance data, the data attributes may include one or more of: time spent processing user data, time spent processing system data, processor idle time, processor waiting time, time spent servicing interrupts, and time spent servicing soft interrupts (softirqs). Such computer processor performance data is obtainable for example by use of the Linux "dstat" command.

In various embodiments, the same (or at least a comparable) mean-difference z-score definition is used in filtering out less important anomalies. In particular, in some embodiments, if no explanatory predicate can be generated for an anomaly transition point candidate, the anomaly transition point candidate is considered unimportant, and is not reported, for example by removing it from a collection of anomaly transition point candidates for possible subsequent reporting. Furthermore, the mean-difference z-score may also be used to select the most relevant anomaly transition point candidate among a group of closely-situated (e.g. in time) anomaly transition point candidates. In particular, according to some embodiments, the anomaly transition point candidate with the highest z-score from a group of closely-situated anomaly transition point candidates is selected as representative of the group. This anomaly transition point candidate may be retained for possible reporting as an anomaly transition point, while others in the group may be removed as possible anomaly transition points.

Figure 2:
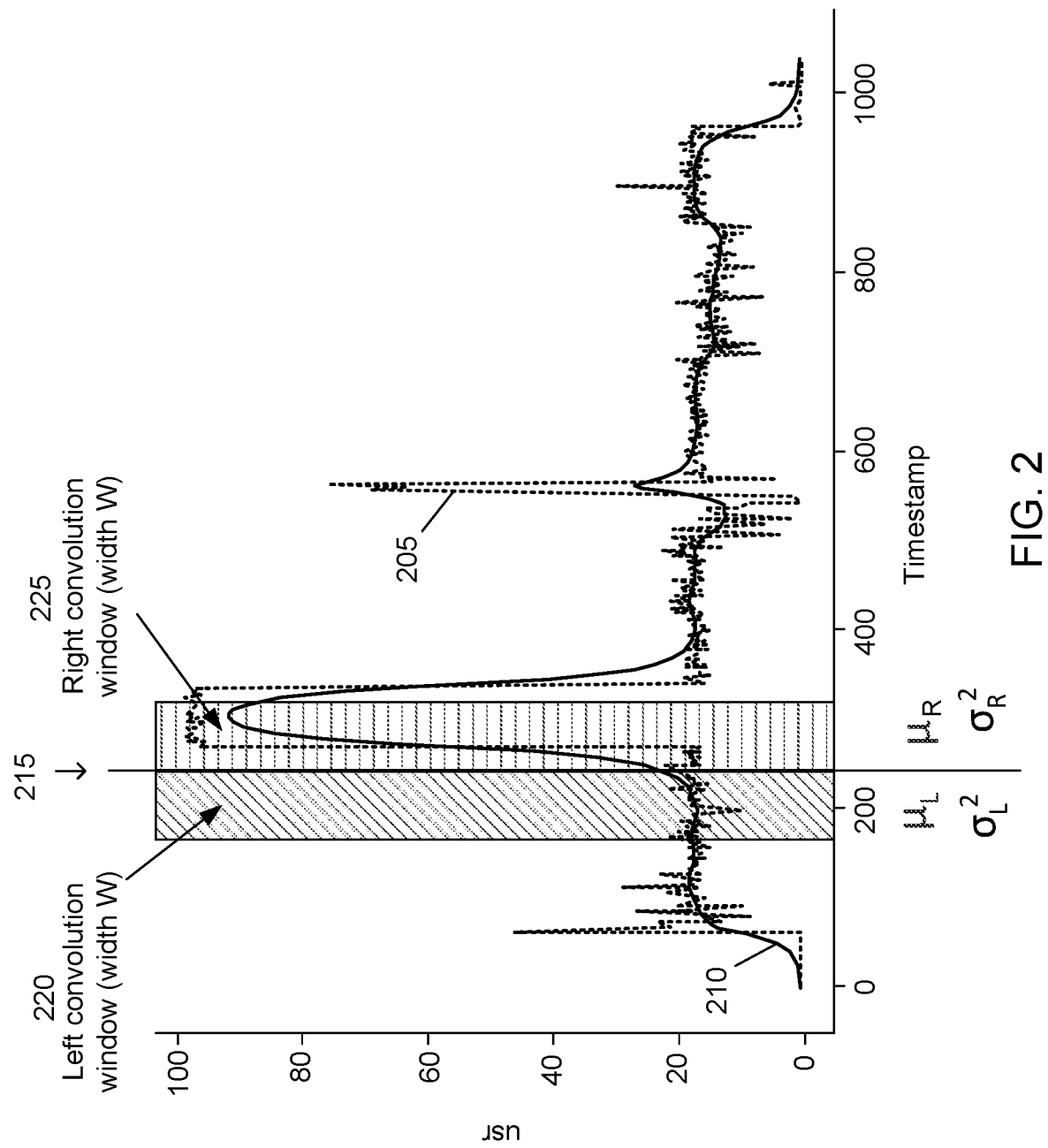
FIG. 2 illustrates, by way of example, aspects of a z-score calculation and LRZ convolution process which is used in various embodiments of the present invention.

FIG. 2 illustrates, by way of example, aspects of a LRZ convolution process which is used in various embodiments of the present invention. In particular, LRZ convolution operation is used by the anomaly detector 110. The LRZ convolution process is so named because of its use of both left and right convolution windows, as well as the use of mean-difference z-scores. The LRZ convolution process refers to the practice of computing mean-difference z-scores at a plurality of (possibly all) reference values or timestamps.

FIG. 2 shows a plot of time-series data 205 with time values (timestamps) on the X-axis and values on the Y-axis. In the present example, the time-series data 205 represents a percentage of computer processor (CPU) usage inside a computer system that is used to service user "usr" processes. A smoothed (e.g. Kalman-filtered) version 210 of the time-series data is also shown. A particular reference point-in-time 215 (also referred to more generally as a reference value) is shown using a vertical line. A window 220 of constant width W to the left of point 215 is called the "left convolution window" (L for short), and a window 225 of the same width W is called the "right convolution window" (R for short). In various embodiments, these windows can be the same or different widths from one another. In some embodiments, the point-in-time 215 can be considered, for definiteness, as belonging to the right window 225. The following four statistical metrics on the L and R windows are defined. The mean value of the portion of time-series data 205 that is located within the L-window 220 is denoted by $\mu_L$, and the variance of this data is denoted by $\sigma^2_L$. The mean value of the portion of time-series data 205 that is located within the R-window 225 is denoted by $\mu_R$, and the variance of this data is denoted by $\sigma^2_R$.

In common parlance, mean value is the mathematical average of the values. Usually, the square root of the variance is called standard deviation ($\sigma_L$ or $\sigma_R$) and is commonly used as a measure of the spread among the values. The lower the standard deviation, the less spread-apart (that is, more close-together) the values are. The higher the standard deviation, the more spread-apart (that is, less close-together) the values are.

In various embodiments, the z-score of the mean difference $|\mu_L-\mu_R|$ is defined according to the following equation:

$$z-\text{score} = \frac{|\mu_L - \mu_R|}{\sqrt{\frac{\sigma_L^2 + \sigma_R^2}{W}}} \quad (1)$$

The observations under both L and R are considered to be statistical samples. In some embodiments, according to standard statistical analysis techniques, for the Central Limit Theorem (CLT) to adequately apply, the number of samples (in our case, the window widths W) may be required to be at least 30. Smaller sample sizes are usable, but may not necessarily yield optimum results. The z-score is in units of number of standard deviations. A high z-score (say 5 or more) means that the samples in L and R come from different underlying populations, with high probability. The higher the z-score, the higher the probability of the samples coming from different underlying populations. Conversely, a low z-score (say close to 0) means that the samples in L and R come from the same underlying population, with high probability, and a transition point likely does not exist at the current timestamp. Different underlying populations can refer to data generated due to the data-generating process being in different respective behavior modes. The term "timestamp" can refer to the reference point-in-time 215 of FIG. 2.

More precisely, $|\mu_L-\mu_R|$ values can be viewed as being normally distributed around 0. Therefore:

When z-score=1, it can be said that 68% of the $|\mu_L-\mu_R|$ values are within 1 standard deviation of $|\mu_L-\mu_R|$ When z-score=2, it can be said that 95% of the values are within 2 standard deviations.

When z-score=3, it can be said that 99.7% of the values are within 3 standard deviations.

When z-score=4, it can be said that 99.994% of the values are within 4 standard deviations.

When z-score=5, it can be said that 99.9999% of the values are within 5 standard deviations.

It is noted that the number of standard deviations in which the indicated percentage of values lie is directly represented by the z-score. Therefore, a high z-score at a particular timestamp means that the observed mean difference value $|\mu_L-\mu_R|$ is a correspondingly rare occurrence. In other words, a high z-score invalidates the null hypothesis that the samples in L and R come from the same underlying population (generated by the same behavior mode). This implies that the samples in L and R come from different underlying populations (or generated by different behavior modes, one anomalous and the other not).

For the purpose of identifying anomaly transition points, a high z-score for $|\mu_L-\mu_R|$ means that, for the timestamp value at the current center of the L and R windows, the underlying generative processes for the signal changes so drastically that essentially, the samples in L and R can be considered different signals. That is what pushes apart the mean values of L and R significantly. It is inferred that either L is an anomalous region and R not, or vice versa. Optionally, additional tests may be applied to determine which of L and R is likely the anomalous region. It is further inferred that the timestamp under consideration is an anomaly transition point candidate if the z-score of the mean-difference is high. By performing the LRZ convolution process, i.e. by testing a significant number of timestamp values, the location of the transition can be identified more precisely.

It is noted that a difficulty occurs when an attempt is made to push the convolution windows to the extreme left or extreme right of a finite sample set. This is because there are no observations to the left of the leftmost or the right of the rightmost points. Nevertheless, when the window width W is small compared to the entirety of the signal, anomaly transition point candidates for a major portion of the time-series can be determined. In some embodiments, observations can be "extended" to the extreme-left and extreme-right using made-up values computed using some extrapolation techniques. In such a case, anomalies in the entirety of the signal can be determined.

In some embodiments, the L and R convolution windows can have different widths, $W_L$ and $W_R$, respectively. In this case, the z-score of the mean difference $|\mu_L-\mu_R|$ is alternatively defined according to the following equation:

$$z\text{-score of mean difference} = \frac{|\mu_L - \mu_R|}{\sqrt{\frac{\sigma_L^2}{W_L} + \frac{\sigma_R^2}{W_R}}} \quad (1a)$$

Use of different L and R window widths can adjust the anomaly detection behaviour, for example if $W_L > W_R$ (e.g. $W_L = 2W_R$) then a larger amount of historical samples is available upon which to base decisions of whether an anomaly has occurred, which tends to result in fewer anomalies. Typically it may be required that both $W_L$ and $W_R$ are at least 30 samples in width.

Having described above the underpinnings of the z-score, the LRZ convolution process can now be described. The LRZ convolution process receives, as input, a time-series of values for a particular statistic (or multiple such time-series values for different statistics). The LRZ convolution process provides, as output, a collection zero or more timestamps (anomaly transition points) where anomalies are placed.

Figure 3:
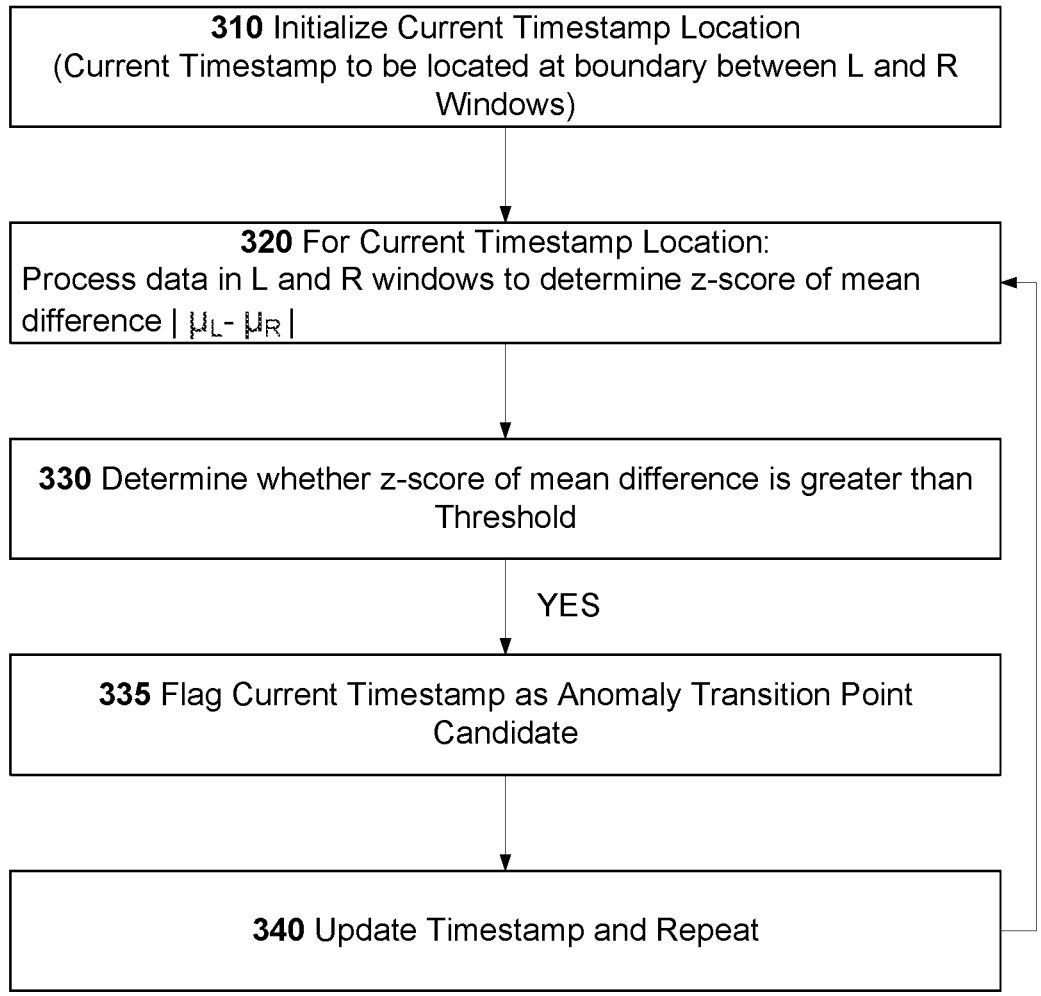
FIG. 3 illustrates a left-right z-score (LRZ) convolution process for detecting anomalies based on a single dimension of data, according to an embodiment of the present invention.

FIG. 3 illustrates the LRZ convolution process 300 according to an embodiment of the present invention. In step 310, a current location for the timestamp (more generally, reference value), to be located at the centre of the L and R convolution windows, is initialized, for example to a value near a beginning of the time-series data. In step 320, for the current location of the timestamp, a z-score of the mean-difference $|\mu_L-\mu_R|$ is determined by processing data in the L and R windows to the left (immediately preceding) and right (immediately following) of the timestamp. In step 330, a determination is made as to whether the z-score of step 320 is greater than a predetermined threshold. If so, the current timestamp is flagged 335 as an anomaly transition point candidate, for example by storing it in a list of such candidates. In some embodiments, the predetermined threshold can be 5, 10, or another suitable value appropriate to the type of input data and the objective of the anomaly detection process. In step 340, the current location for the timestamp is updated (e.g. incremented) and steps 320 to 340 are then repeated. The repetition of steps 320 to 340 can occur until a stopping condition is reached, for example until the timestamp reaches a predetermined value near an end of the time-series data. Updating the current location for the timestamp can involve incrementing the current location by one unit, or by a predetermined multiple of units, where such units represent the time interval between successive instances of the time-series data.

Figure 4:
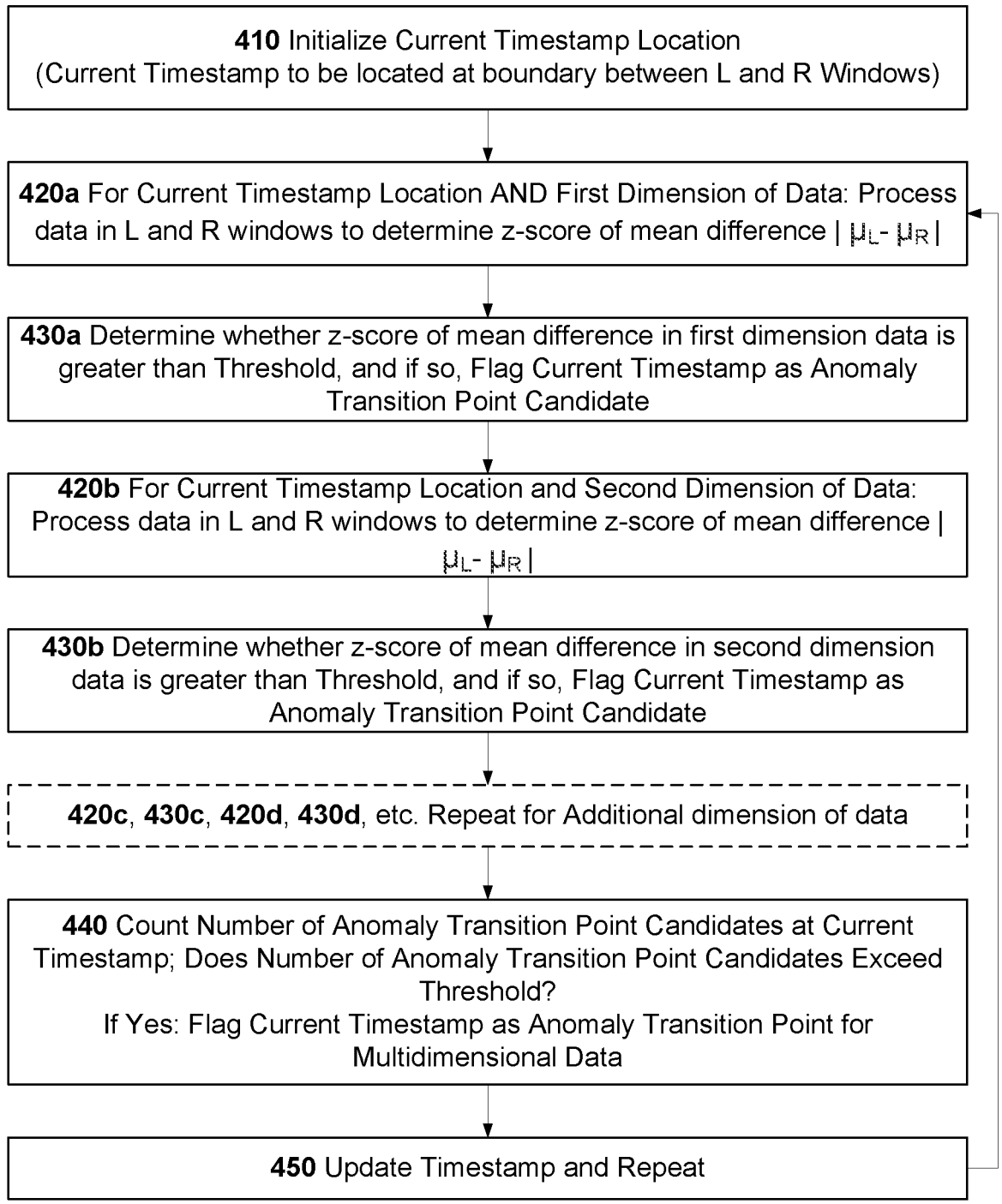
FIG. 4 illustrates a LRZ convolution process for detecting anomalies based on multiple dimensions of data, according to another embodiment of the present invention.

FIG. 3 is a simplified process pertaining to cases where only one dimension of time-series data is analyzed. FIG. 4 illustrates a LRZ convolution process 400 according to another embodiment of the present invention, particularly in which multiple dimensions of time-series data are analysed concurrently. Each dimension of time-series data can correspond to a sequence of time-stamped values, or in other words each dimension can correspond to a different series of values indexed against the same series of reference values (timestamps). In step 410, a current location for the timestamp is initialized, similarly to step 310. In step 420a, for the current location of the timestamp and for a first dimension of the time-series data, a z-score of the mean-difference $|\mu_L-\mu_R|$ is determined by processing data in the L and R windows to the left and right of the timestamp. In step 430a, a determination is made as to whether the z-score of step 420a is greater than a predetermined threshold, similarly to step 330. If so, the current timestamp is flagged as an anomaly transition point candidate for the first dimension of time-series data.

In step 420b, for the current location of the timestamp and for a second dimension of the time-series data, a z-score of the mean-difference $|\mu_L-\mu_R|$ is determined by processing data in the L and R windows to the left and right of the timestamp. In step 430b, a determination is made as to whether the z-score of step 420b is greater than a predetermined threshold, similarly to step 330. If so, the current timestamp is flagged as an anomaly transition point candidate for the second dimension of time-series data.

Similar steps 420c, 430c, 420d, 430d, etc. (not shown) can be performed for each additional dimension of the time-series data to be processed.

In step 440, for the current timestamp, a count of the number of anomaly transition point candidates resulting from steps 430a, 430b, etc. is made. A determination is made as to whether the count from step 440 exceeds a predetermined threshold. If so, the timestamp is flagged as an anomaly transition point candidate for the entire multiple dimensions of time-series data. As such, anomaly transition point candidacy can be determined based on a plurality of z-scores.

Step 440 the LRZ convolution process 400 confirms a particular timestamp to be an anomaly transition point candidate because multiple statistics declare the timestamp to be an anomaly transition point candidate. In many applications, gathered statistics are moderately to highly correlated, and an anomaly is manifested in many statistics at once. Of course, if various statistics are highly uncorrelated in a particular application domain, "#-of-candidates-threshold" can be set to 1.

In step 450, the current location for the timestamp is updated (e.g. incremented) and steps 420a, 430a, 420b, 430b, etc. and 440 to 450 are then repeated, similarly to step 340. This repetition can occur until a stopping condition is reached.

It is noted that steps 420a, 430a, 420b, 430b, 440, etc. can be carried out in different orders. In some embodiments, rather than processing each dimension of time-series data and then updating the timestamp, each dimension of time-series data can be fully processed separately at all timestamp values, and the results later merged or processed together.

In some embodiments, detection of an anomaly transition point or candidate is declared when the average z-score across all statistics is greater or equal to a threshold value. If an average z-score is taken, its threshold value may be lower than in the case in which absolute z-score thresholds are used. This is because z-scores in some dimensions where an anomaly is not manifested might be close to 0 or 1, and in other dimensions where an anomaly is manifested might be 5 or higher. It is noted that the expected values of z-score in a region where transition point does not exist is 0. This results in anomalies being declared only in response to significant changes in the underlying data.

In various embodiments, and to reiterate, the LRZ convolution process processes most of the timestamps in time-series data. The time-series can have one or more attributes called "statistics". For each processed timestamp value, two windows of fixed widths called "left window" and "right window" (L and R for short) are defined. Mean and variance values are calculated for data points falling under L and R windows, and from those values, the z-score of the difference between the mean values is calculated. The z-score is an indication of how different the values belonging to L and R windows are. If the z-score at a timestamp is large enough for several statistics at once, an overall anomaly transition point candidate at that timestamp is identified. Z-score is a known concept from statistics, and two-dimensional convolution windows are well-known in digital image processing. Z-score can be defined differently in two distinct scenarios, namely z-score for a value in a sequence of values, and z-score for differences of the mean values of two sequences. According to embodiments of the present invention, and as mentioned above, the definition of z-score is that of the second scenario. Also according to embodiments, it is noted that z-scores are combined with two one-dimensional convolution windows, namely the L and R windows, in a particular processing operation referred to as the LRZ convolution process.

As mentioned above, according to various embodiments, an explanation generator 120 receives output from the anomaly detector 110 and generates explanatory predicates for at least some and possibly all of the provided anomaly transition point candidates. The explanation generator receives as input a collection of anomaly transition point candidates generated by the anomaly detector, and provides as output, for some or all anomaly transition point candidates, a collection of explanatory predicates. Alternatively, the explanation generator may be viewed as providing a collection of explanatory predicates for all anomaly transition point candidates, with the caveat that the collection for one or more of the anomaly transition point candidates may be empty, in that it may contain zero explanatory predicates.

Understanding operation of the explanation generator can again be understood with reference to FIG. 2. FIG. 5 illustrates the explanation generation process 500 according to some embodiments. According to this process, at a first step 510, at each anomaly transition point candidate (for example, at the point-in-time 215), the percent change of the mean values between L and R is determined as $$\left(\frac{\mu_L - \mu_R}{\mu_L}\right) * 100.$$

If the percent change is positive, the mean value of the data being processed has decreased at the transition point candidate. If the percent change is negative, the mean value of the data being processed has increased at the transition point candidate. The data being processed refers to the data in L and R windows. This data is also referred to as the statistic. The name of the statistic is denoted by "s."

At a second step 520, again for each of the anomaly transition point candidates, one of the two explanatory predicates "s is lower by $$\left(\frac{\mu_L - \mu_R}{\mu_L}\right)*100 \text{ percent}"$$

by $$\left(\frac{\mu_L - \mu_R}{\mu_L}\right)*100 \text{ percent}"$$

is generated, as appropriate. In various embodiments, this predicate is generated only if the corresponding z-score exceeds a predetermined threshold value. The threshold value may be at least six, and may be about ten, for example. This threshold value may also be a (potentially adjustable) parameter of the explanation generation process, and its value can be (but not necessarily) the same as the threshold value used by the LRZ Convolution process. A low threshold value generates more predicates; a high threshold generates fewer predicates. After all of the predicates have been generated, each one for a different statistic, they may be ordered by decreasing z-score values. Predicates at the beginning of a presented list have higher z-score and more explanatory power than the ones towards the end of the list. As mentioned, steps 510 and 520 are repeated 530 for each anomaly transition point candidate.

Other types of explanatory predicates may also be provided. A predicate may generally contain a verb and give information (e.g. quantitative or qualitative) about a subject. Multiple observables or predicates may be combined together to generate new predicates. A collection of predicates can be combined together to generate a higher level predicate. For example, if disk usage, processor usage, and memory usage all increase by a predetermined amount, a predicate indicating that the monitored computer system is under stress may be generated. In some embodiments, predicates can be provided (e.g. piped) to automatic actions, in the sense that if a certain predicate is generated, a specified action may automatically be taken.

As mentioned above, according to various embodiments, an anomaly filter 130 receives, as its input: output (sets of anomaly transition point candidates) from the anomaly detector 110; and output (explanatory predicates) from the explanation generator 120. The anomaly filter then generates a potentially reduced set of anomaly transition points. In some embodiments, the anomaly filter removes anomaly transition point candidates from the set whenever such anomaly transition point candidates are not accompanied by any explanatory predicates. This may occur for example when the z-scores associated with an anomaly transition point candidate are less than a predetermined threshold value. Output of the anomaly filter 130 is a set of anomaly transition points and their associated explanatory predicates.

In various embodiments, and to reiterate, embodiments of the present invention provide for anomaly explanation (explanatory predicate) generation and ordering using z-scores. For each anomaly transition point candidate identified by an anomaly detector, a collection of explanatory predicates are generated. Each predicate in the collection is for a different statistic, and is based on the z-score of the difference between mean values of that statistic in the "left" and "right" windows placed at that transition point candidate. If the z-score is above a threshold value, a predicate for example of the form "usr is 280% higher" or "sys is 80% lower" is generated. The explanatory predicate collection itself is ordered by decreasing z-scores whereby predicates with more explanatory power appear before those with less explanatory power.

FIG. 6 illustrates the anomaly filtering process 600 according to some embodiments. In step 610, for each provided anomaly transition point candidate, a determination is made as to whether there are any explanatory predicates associated with that anomaly transition point candidate. If there are no such explanatory predicates, the anomaly transition point candidate is deleted 615 from the set.

In step 620, additional anomaly transition point candidates are processed in order of increasing timestamp values, as follows. For a current anomaly transition point candidate, a determination 622 is made as to whether a prior (i.e. with earlier timestamp) anomaly transition point candidate exists within a fixed time interval of predetermined width W. If so, a comparison 624 is made between the average z-scores of the current anomaly transition point candidate and the prior anomaly transition point candidate. The average z-score of an anomaly transition point candidate is the average z-score across all of the anomaly transition point candidate's explanatory predicates. If the current anomaly transition point candidate has a higher average z-score, the previous anomaly transition point candidate is replaced 626 with the current anomaly transition point candidate. If the prior anomaly transition point has a higher average z-score, the current anomaly transition point candidate is deleted 628.

The rationale behind this filtering step 620 is as follows. Sometimes, a number of adjacent anomalies are reported because a non-anomalous region is about to end and an anomalous region is about to begin (or vice versa). In that case, a number of adjacent or closely situated timestamps qualify to be reported as anomaly transition points. After this filtering step, among such closely situated timestamps, only the one with the highest average z-score survives. That is, the filtering step 620 can alternatively be specified as: selecting, out of a plurality of anomaly transition point candidates within a given interval, a single anomaly transition point having a highest z-score among the plurality, and deleting all of the plurality other than the single anomaly transition point. A further effect of this filtering step is that no more than one anomaly transition point is reported for a window of width W. Alternatively, a reduced set, e.g. two or more but not all, of the anomaly transition points within the given interval can be retained. Data from multiple anomalies within the interval can be combined, and the accompanying explanatory predicate(s) can be based on such combined data. The explanation generation system can be re-engaged in such cases.

The filtering step 620 reduces the number of anomalies reported, but may miss two closely related but distinct anomalies. A simplifying assumption can be made that two distinct anomalies situated within W time units of each other are, in fact, the same anomaly, and between them, the one with the higher average z-score will be retained.

The anomaly filter is an optional subsystem in various embodiments. If it is omitted or disabled, the output format of the overall procedure remains unchanged. However, with the filter turned off, more anomalies will be reported. In one embodiment, when detecting anomalies in the field of computer system performance monitoring, the filter may be enabled.

In various embodiments, and to reiterate, embodiments of the present invention provide for filtering of potential anomaly events using explanatory predicates. The explanatory predicates may be used to filter out unimportant or false-positive anomalies, using z-scores.

Filtering may occur in up to three scenarios, and up to three different corresponding senses. First, during an explanation generation phase, if the z-score for a statistic is below a threshold value, a corresponding explanatory predicate is not generated because explanatory power of that statistic is deemed low. Second, if no predicates can be generated for an anomaly transition point candidate, because z-scores of all of the statistics are below the threshold value, the anomaly transition point candidate is not reported at all. This reduces the number of reported anomaly transition points, which can be beneficial in scenarios where too many anomaly transition points are being reported. Third, multiple closely located anomaly transition point candidates are replaced with a single anomaly transition point with the highest average z-score among them.

Figure 7:
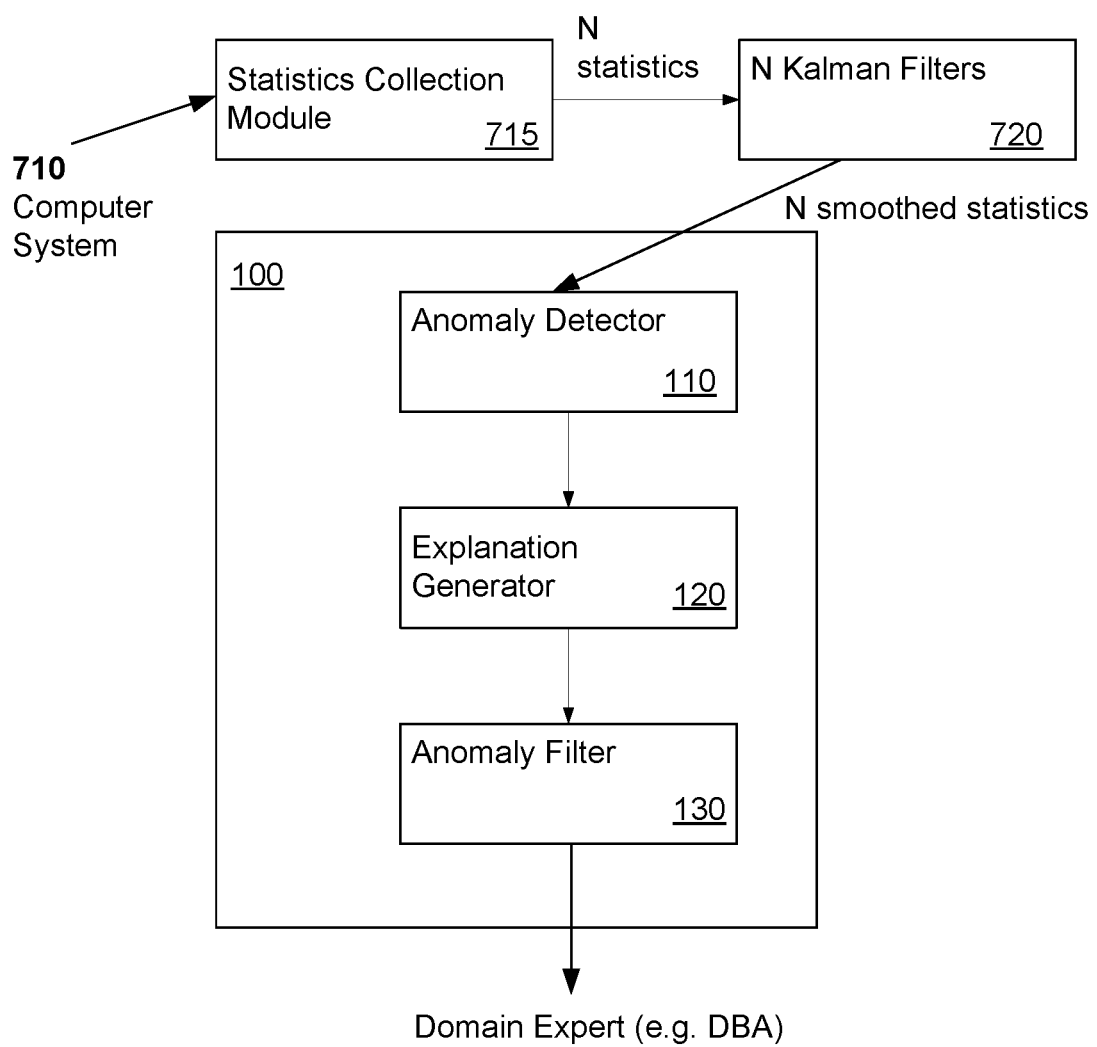
FIG. 7 illustrates an automatic anomaly detection system according to a first example embodiment of the present invention.

FIG. 7 illustrates an automatic anomaly detection system according to a first example embodiment of the present invention. The system can detect and explain anomalies found using a computer system. The system can run on a different computer system than the one being monitored, or the system can run on the same computer system as the one being monitored. Arrow directions indicate data flow directionality. The computer system 710 can be a standalone, networked, or cloud-based system. The computer system can be part of a database system. The statistics collection module 715 runs on the computer system, and gathers a predefined set of statistics. A timestamp or series of timestamps is associated with each such set. A particular instantiation of the module 715 is the "dstat" command of Linux, but it can also be a custom program or script. A sample invocation of "dstat" can collect CPU, virtual memory, IO, and interrupt data from the underlying computer system.

The statistics collection module 715 creates tabular data, and may optionally store it in a file. The data format can be flexible, and two possible formats are CSV (comma-separated values) file, and XML. In total, N separate statistics, each one a time-series, are collected.

The N statistics are processed by N respective filters 720, such as Kalman filters, each filter smoothing a different statistic. Alternatively, fewer than N filters may be provided, at least some of which may smooth two or more statistics. As such, the data processed during anomaly detection can be a filtered version of raw data. Alternatively, for example as in FIG. 8, the data can be the raw, unfiltered data. The purpose of smoothing is to eliminate short-term spikes, and to emphasize or enhance long-term trends in data. As a result of this filtering, N smoothed statistics are created. One such smoothed statistic is shown in FIG. 2 as data 210. The N smoothed statistics, each one being time-series data for example, are processed by the anomaly detection system 100, which is described above with respect to FIG. 1. The resulting anomaly transition points and associated explanations can be provided to a domain expert. The domain expert may be a database administrator if the computer system is running a database management system.

Some potential advantages and features of the first example embodiment are as follows. First, the embodiment can be used in application domains in which statistics contain noise. If care is not taken, noise can be mistaken for anomalies. Smoothing will eliminate such noise, and the resulting system will be less likely to produce false-positives (noise labeled as anomalies). Sometimes, computer systems generate hundreds of statistics, but they can be categorized. For example, if a computer has 8 cores or CPUs, statistics such as "usr", "sys", "idl", "wai", "hiq", and "siq" for each core may be obtained, for a total of 48 statistics indicative of CPU operation. It might be useful to aggregate and average these to bring the number down to 6 statistics, one for each of category. The "statistics collection" module can be used for such data clean-up and aggregation. The rest of the system is unaffected by what and how much preprocessing raw statistics go through. As already mentioned, anomaly explanations are provided in order of decreasing z-scores. Therefore, predicates at the beginning of the ordering are likely have more explanatory powers than predicates at the end.

In some embodiments, the anomalies themselves may be ordered as follows. For each anomaly transition point, the average z-score of the explanations is computed, and the anomalies are ordered by such average z-scores in descending order. Anomalies at the beginning are likely to be more important than the ones at the end of the list because anomalies at the front show more extreme data deviations, and therefore, are more pronounced. A human domain expert may look at a limited number of the top anomalies (e.g. top three) each observation period, such as each day.

Figure 8:
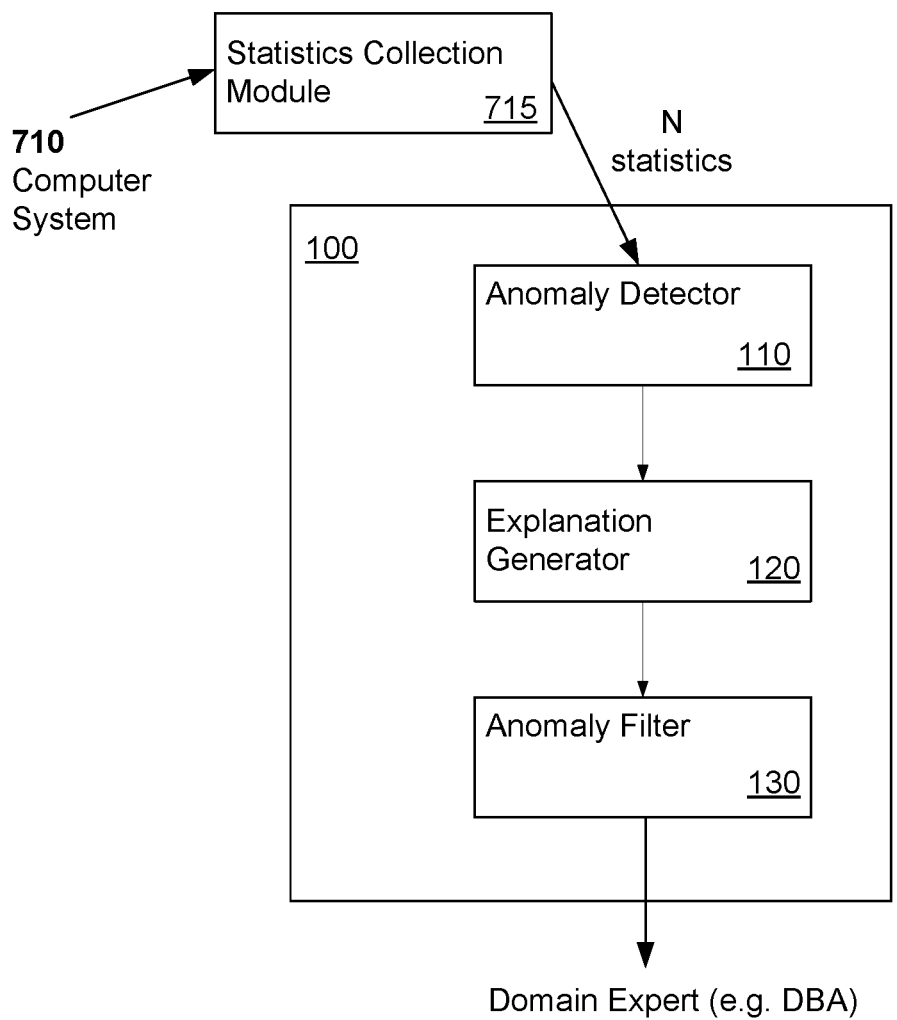
FIG. 8 illustrates an automatic anomaly detection system according to a second example embodiment of the present invention.

FIG. 8 illustrates an automatic anomaly detection system according to a second example embodiment of the present invention. This can be viewed as a simplified version of the first example embodiment above, and components in FIG. 8 are substantially the same as their corresponding components in FIG. 7. Most notably, in this embodiment, the smoothing module (implemented using N unscented Kalman filters 720 in FIG. 7) is omitted. Instead, the unsmoothed N statistics are directly processed by the anomaly detection system 100.

The second example embodiment provides an instance in which smoothed or processed signals are not required. In preliminary tests by the inventors, an almost identical set of anomaly transition points were reported for both the first and second embodiments.

Some potential advantages and features of the second example embodiment are as follows. This embodiment may be preferred in application domains in which statistical signal fidelity must be preserved, or in application domains in which no suitable smoothing algorithms have yet been developed. This embodiment may be preferred in application domains in which statistics contain short-duration or "spiky" (i.e. with high-frequency signal components) anomalies. Smoothing might have eliminated such anomalies incorrectly. Finally, the second example embodiment is simpler due to the lack of filtering.

Figure 9:
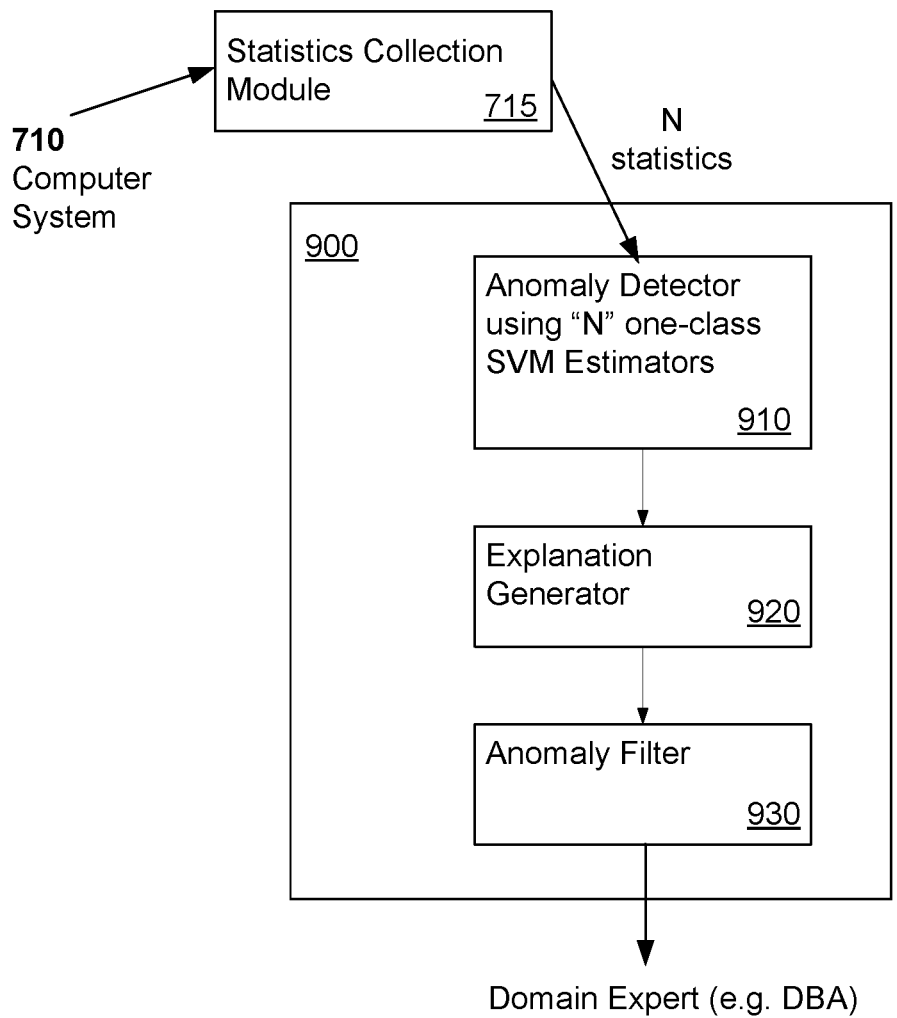
FIG. 9 illustrates an automatic anomaly detection system according to a third example embodiment of the present invention.

FIG. 9 illustrates an automatic anomaly detection system 900 according to a third example embodiment of the present invention. This can be viewed as a variation of the second example embodiment above, and components in FIG. 9 are substantially the same as their corresponding modules in FIGS. 7 and 8. It is noted that filters (e.g. filters 720) can also be included in the third example embodiment.

The third example embodiment involves extensibility of the automatic anomaly detection system. In particular, in this embodiment, anomalies are detected using Support Vector Machines (SVM). As such, it is considered that embodiments of the present invention can generally be provided in which the LRZ convolution operation is replaced by another operation for detecting anomalies. This other operation can be, but is not necessarily limited to, the SVM that has been trained to learn to detect anomalies in data.

According to some embodiments, the SVM for anomaly detection operates as follows. It is noted that the description herein describes to an SVM configured and trained for anomaly detection. Other details of the SVM will be readily understood by a worker skilled in the art. In an embodiment, the anomaly detector 910 includes a number N of one-class SVMs, one for each of the N statistics being collected by the statistics collection module 715. One-class SVMs may be used because there is only a need to classify an observation as belonging to the "normal" class, or not (in which case the observation is anomalous). An observation may be a data point at a single time of time-series data, i.e. a numerical indication of a system state at a particular time, for example. Each of the SVMs is trained (or fit) using a window's worth of data (e.g. a window having 30 to 50 observations) to the left of a timestamp. Each of the SVMs is configured to classify whether the next observation is anomalous or not. If a large number of the SVMs classify the next observation as anomalous, an anomaly is declared. It is noted that, because anomalies classified by the SVM are one time-unit wide, they can be passed along to the Explanation Generator subsystem 920 as transitions points. An anomaly filter 930 is also provided, similar to the anomaly filter 130 of FIG. 1.

In some embodiments, if the anomaly detector 110, 910 implements another anomaly detection process (e.g. other than LRZ convolution process or a SVM that identifies an anomaly using 'start' and 'end' timestamps, both of the start and end points may be included as anomaly transition points in the data provided to the Explanation Generator subsystem 920. In other embodiments of the present invention, the anomaly detector 110, 910 may include other various types of classifiers other than SVMs, which may be based on machine learning for example. These classifiers are trained to learn to classify whether the next observation is anomalous or not.

Some potential advantages and features of the third example embodiment are as follows. First, it provides for extensibility of the automatic anomaly detection system, beyond reliance on the LRZ convolution process. Second, if domain experts are already comfortable using an existing anomaly detection procedure, this existing procedure can be implemented in the anomaly detector 110, 910 while still benefiting using from the Explanation Generator 120, 920 and (optionally) Anomaly Filter 130, 930 of the automatic anomaly detection system 100, 900. Third, it has been observed that the SVM usually tends to detect more anomalies than the LRZ convolution process. Further in view of this, the anomaly filter 130, 930 was found in tests to be particularly effective in eliminating many of the anomalies with no explanatory predicates. This may have the benefit of removing false-positive detection events.

Figure 10A:
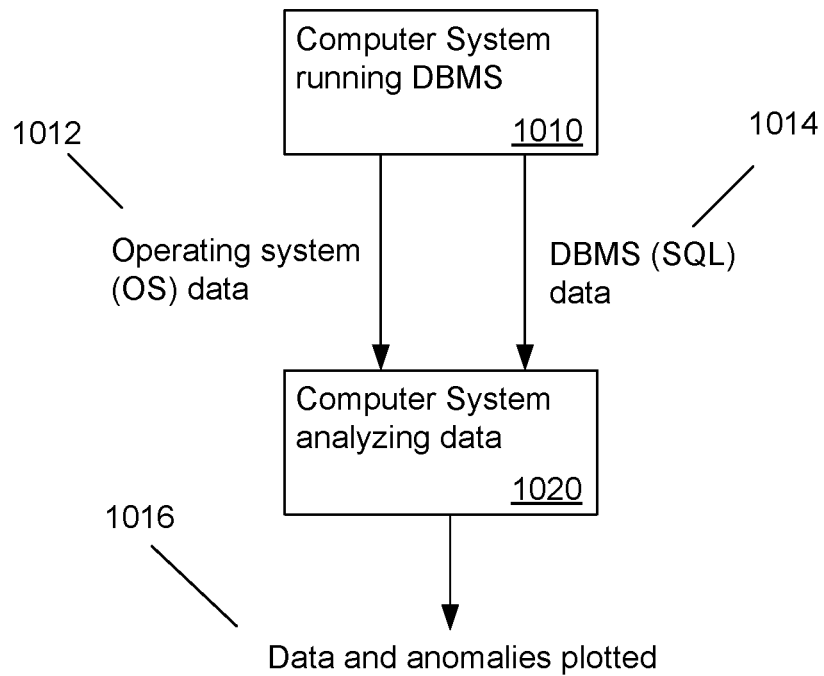
FIG. 10A illustrates an anomaly detection system according to a fourth example embodiment of the present invention.
Figure 10B:
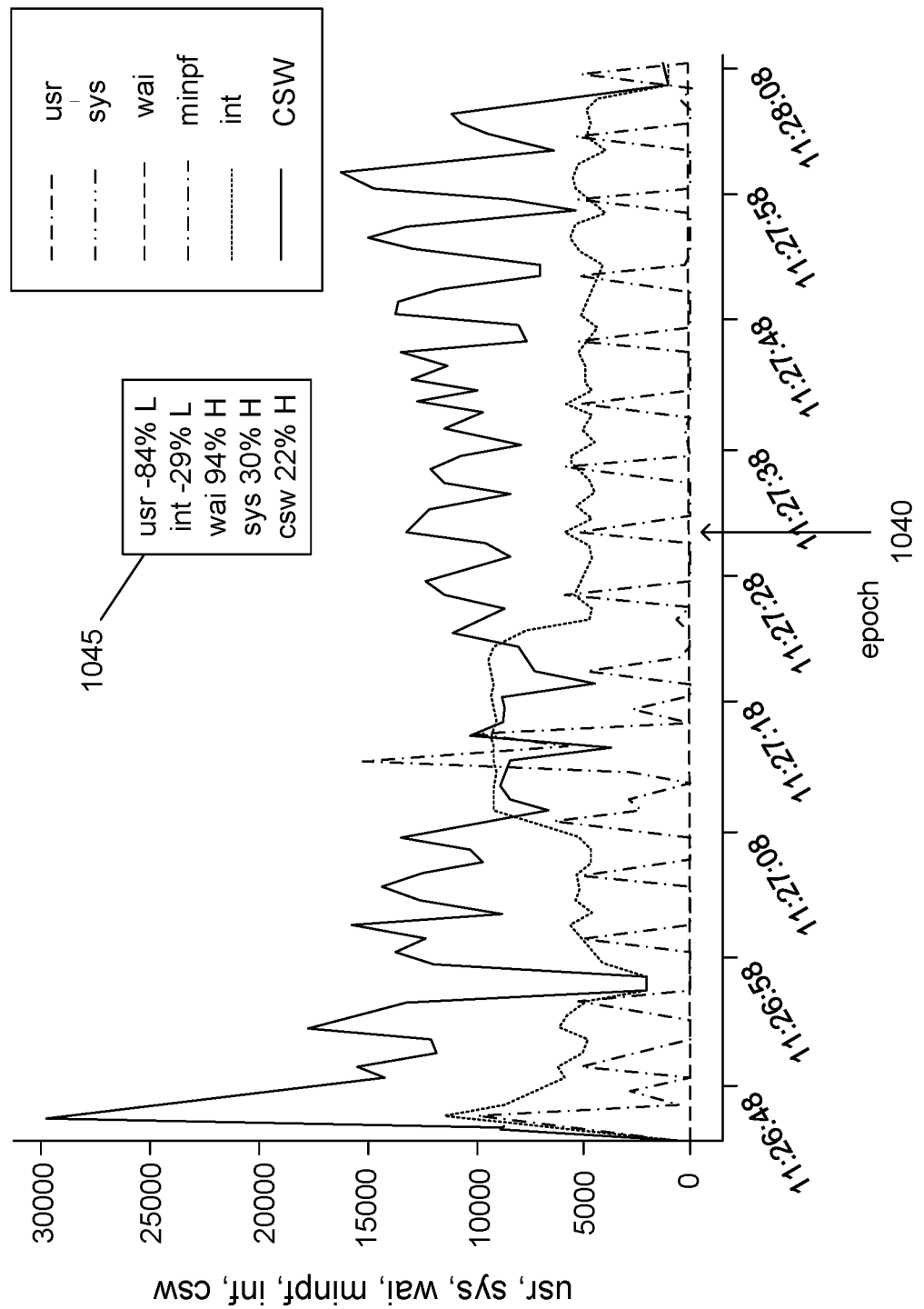
FIGS. 10B and 10C graphically illustrate output of the anomaly detection system of FIG. 10A.
Figure 10C:
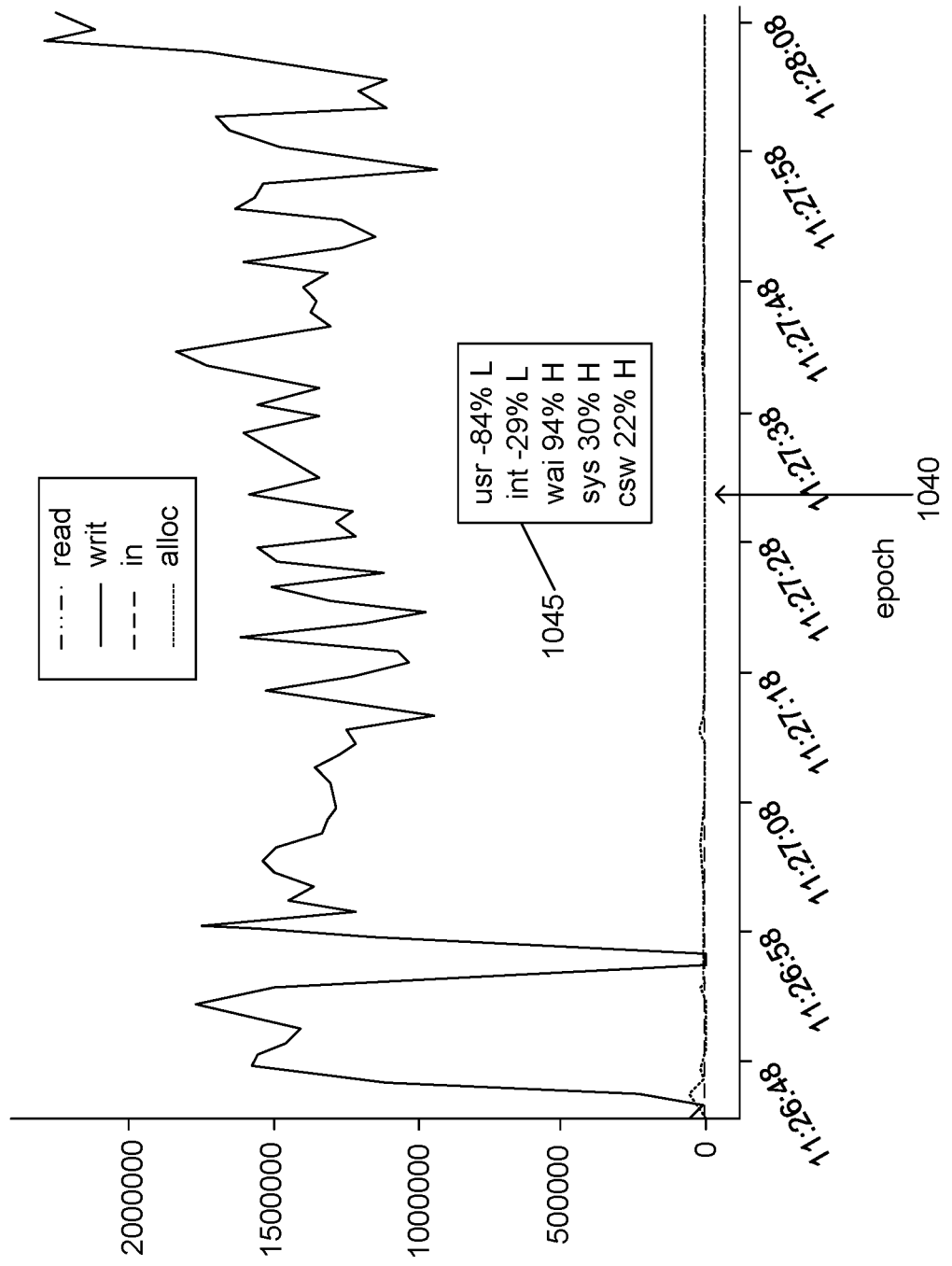

FIGS. 10A to 10C illustrate a fourth example embodiment of the present invention. FIG. 10A illustrates a data capture and analysis system including two computer systems. The first computer system 1010 runs a database management system (DBMS), upon which performance data is being captured. The second computer system 1020 performs data analysis, anomaly detection, anomaly filtering, and explanation generation, according to the present invention.

In this embodiment, two types of data are being captured. The first type is operating system data 1012 (captured for example once per second). The second type of data is DBMS data 1014 (captured for example once every 5 seconds). Both of these data types are time-series data. The first computer system 1010 provides the two types of data to the second computer system 1020 for processing. The second computer produces output 1016. Two sample graphs indicative of the output 1016 are provided in FIGS. 10B and 10C, indicative of output of the data analysis and anomaly detection performed by the second computer system 1020.

FIG. 10B illustrates six statistics called usr, sys, wai, minpf, int, and csw. These indicate difference computer system processes to which a percentage of computing (e.g. processor) resources are attributed. A detected anomaly transition point 1040 is shown using a long arrow. The anomaly's explanation (explanatory predicates) 1045 is also shown inside a box. There are 5 explanatory predicates. The first one, for example, says that at the point anomaly was detected, CPU usage in 'usr' mode dropped by 84% from what it was before.

FIG. 10C illustrates four additional statistics called read, writ, in, and alloc. These indicate difference computer system processes to which a percentage of computing (e.g. processor) resources are attributed. The anomaly transition point 1040 is also illustrated in this graph, along with the explanation (explanatory predicates) 1045. In some embodiments, all of the statistics of FIGS. 10B and 10C can be displayed on the same graph in a user interface. In some embodiments, only the explanatory predicates pertaining to statistics shown on a particular displayed graph are shown in the user interface. In some embodiments, explanatory predicates pertaining to certain statistics are shown on the displayed graph, even if those statistics are not displayed on the graph.

According to embodiments of the present invention, as mentioned above, automatic anomaly detection can be applied to the domain of computer system performance monitoring, or database management system performance monitoring, or both (e.g. performance monitoring of a computer system running a database management system). According to other embodiments of the present invention, automatic anomaly detection can be applied to another domain, for example in the analysis of time-series data or other types of data thereof. Examples of such domains include, but are not necessarily limited to: weather sensing systems; devices that electronically communicate with each other, such as Internet of Things (IoT) devices; stock market data; and data gathered from instruments used in healthcare.

It is noted that the present invention can be adapted for use in a particular application domain, for example by adjusting thresholds and behaviours. Different application domains may benefit from different anomaly detection thresholds because the definition of abnormal in one application domain may be quite different from the definition of abnormal in another. For example, a relatively small change in human temperature might be considered anomalous and alarming in health-care industry, whereas a change of similar magnitude in stock price might be considered normal. As will be clear from the above discussion, subsystems of the automatic anomaly detection method and system have several parameters that allow practitioners to fine-tune a particular embodiment to suit a solution domain.

For anomaly detection using the LRZ convolution process, variable parameters include the convolution window width, the number of anomalous statistics (i.e. the number of observables or dimensions that are required to be anomalous at the same time before a candidate transition point is declared an anomaly), and the z-score threshold. Each of a greater convolution window width, a larger number of anomalous statistics, and a larger z-score threshold generally lead to a lower number of detected anomalies. For explanation generation, variable parameters include the z-score threshold. The value of this threshold can be different from the one used in anomaly detection. A lower threshold value generally leads to larger number of explanatory predicates being generated. For the anomaly filter, variable parameters include the window width used to determine anomaly closeness. This width can be the same as the width W used in the LRZ convolution process or can be different. The larger the window width, the fewer the number of anomalies detected.

Some or all of the parameter values may be set based on some or all of the following information: the number of reported anomalies that expert users can handle, per day for example; the number of false-positive anomalies being reported; the number of false-negative anomalies (anomalies being missed); and, if data is streaming in, a capacity of the computing platform to perform anomaly detection tasks in real time.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocable for providing various computing resources which in turn are used to realize various computing components of a system, may be regarded as providing a distributed computing system, the internal architecture of which may be configured in various ways.

As mentioned above, in some embodiments, the LRZ convolution process marks a timestamp as an anomaly transition point if there are at least a certain number of anomaly transition point candidates at that timestamp, each one coming from a different statistic. In alternative embodiments, an anomaly may be declared if the average, maximum, or minimum z-score across multiple statistics (at a given timestamp) meet or exceed a predetermined threshold value.

In various embodiments, detecting anomalies can be based on the combination of multiple statistics (or dimensions of time-series data) at once (as described above for example with respect to FIG. 4). This can be beneficial when the multiple statistics are moderately to highly correlated. For example, in the application domain of computer system monitoring, performance data such as CPU usage, disk usage, memory usage, and network usage are moderately to highly correlated. For example, when disk usage increases, often so does CPU usage because it requires CPU to process the additional disk data. If individuals statistics are highly uncorrelated, declaring an anomaly if the maximum z-score exceeds a threshold may be preferred. If individuals statistics are highly correlated, declaring an anomaly if the minimum z-score exceeds a threshold may be preferred.

Some embodiments are configured to deal with missing parts of the input data for example as follows. In some applications, such as weather sensing, time-series data may have holes (missing values) for such reasons as extreme weather conditions, malfunctioning sensors, dead battery, and so on. In such cases, and interpolation technique may be employed to generate missing data values prior to automatic anomaly detection. If the time interval between missing values is sufficiently small compared to the entire set of observations, such interpolation is not expected to degrade anomaly detection quality significantly.

As noted above, extensibility allows for the anomaly detection process to be varied, for example by using a SVM instead of LRZ convolution process, or another anomaly detection process. In a particular application domain, users might be satisfied with an existing algorithm for anomaly detection that they have developed and tuned. Explanation generation and anomaly filtering can still be utilized as described herein. As mentioned previously, for point anomalies, no data changes are required before feeding data to the Explanation Generator subsystem. If anomalies have "start" and "end" timestamps, both of them should be included as potential anomaly transition points input for further processing by explanation generation and anomaly filtering processes.

Embodiments of the present invention comprise an electronic device, for example a computer system, for performing anomaly detection. The electronic device has a processor operatively coupled to memory, where the memory holds program instructions for execution by the processor for performing the automatic anomaly detection. The electronic device may be separate from a computer system subjected to performance monitoring. According to other embodiments, a hardware implementation rather than a computer software (i.e. processor executing program instructions stored in memory) implementation may be provided. For example, using FPGAs (field-programmable gate arrays), automatic anomaly detection procedures can be encoded into silicon chips. Such an embodiment may run much faster than software implementations. At the same time, algorithm parameters in hardware-only embodiments may be more difficult to tune than those in computer software embodiments.

According to some embodiments, multiple window widths may be employed, as described below. In some application domains, time-series data is significantly periodic, and although each period has peaks and valleys, these peaks and valleys do not necessarily constitute anomalies. For example, consider temperatures recorded at a weather station. In a given weather season, each day's temperatures are reasonably cyclical, with daytime temperatures usually higher than nighttime temperatures. As season changes, the difference may increase, decrease, or remain unchanged. There is also a one-year cycle after which a much more complex pattern repeats. Another example is form healthcare industry if one measures a person's heartbeats. For such complex patterns, no single window width will do an adequate job of predicting anomalies. It is straightforward to extend automatic anomaly detection to process data using two or more different window widths. For each window width, the resulting detected anomalies can be reported to a domain expert, who, after necessary analysis, can determine the correct window width. Furthermore, different window widths may be useful to extract different types of anomalies.

Figure 11:
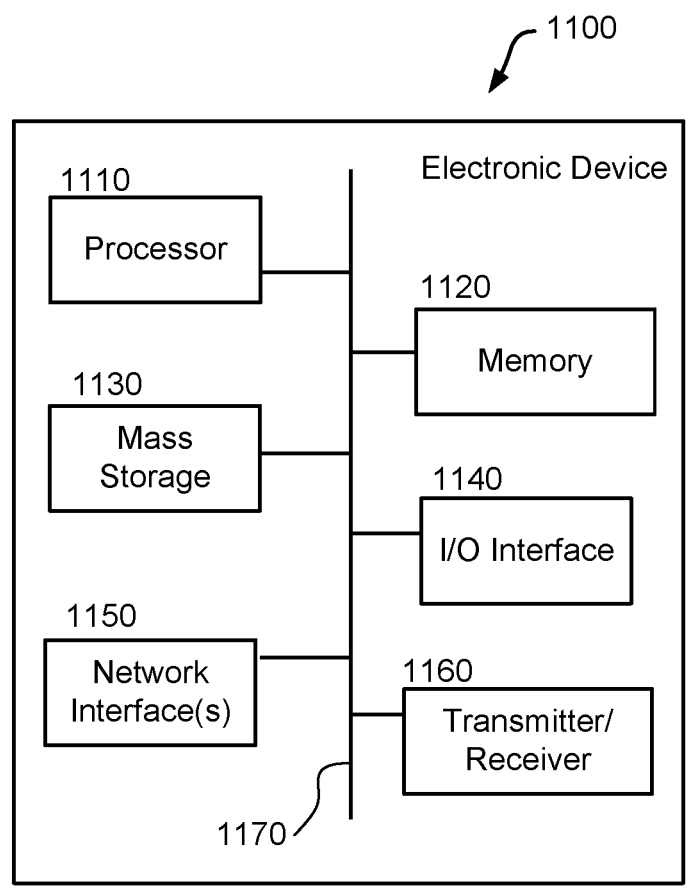
FIG. 11 illustrates a system for performing anomaly detection, according to another embodiment of the present invention.

FIG. 11 is a schematic diagram of an electronic device 1100 that may perform any or all of operations of the above methods and features explicitly or implicitly described herein, according to different embodiments of the present invention. The electronic device may comprise the aspects of the anomaly detection system as described with respect to FIG. 1, for example anomaly detection, explanation generation, and anomaly filtering. These aspects may be provided using software stored in the memory 1120 and/or mass storage 1130, and executed by the processor 1100, for example.

As shown, the device includes a processor 1110, memory 1120, non-transitory mass storage 1130, I/O interface 1140, network interface 1150, and a transceiver 1160, all of which are communicatively coupled via bi-directional bus 1170. According to certain embodiments, any or all of the depicted elements may be utilized, or only a subset of the elements. Further, the device 1100 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 1120 may include any type of non-transitory memory such as static random access memory (SRAM), dynamic random access memory (DRAM), synchronous DRAM (SDRAM), read-only memory (ROM), any combination of such, or the like. The mass storage element 1130 may include any type of non-transitory storage device, such as a solid state drive, hard disk drive, a magnetic disk drive, an optical disk drive, USB drive, or any computer program product configured to store data and machine executable program code. According to certain embodiments, the memory 1120 or mass storage 1130 may have recorded thereon statements and instructions executable by the processor 1110 for performing any of the aforementioned method operations described above. Additionally or alternatively, hardware processing components such as FPGAs or other hardware logic circuitry can be provided and configured for performing such operations.

In some embodiments, the electronic device may a virtual machine for example provided by a compute cluster or a cloud service provider that executes the instructions encoded in software (e.g. of the anomaly detection system of FIG. 1).

Figure 12:
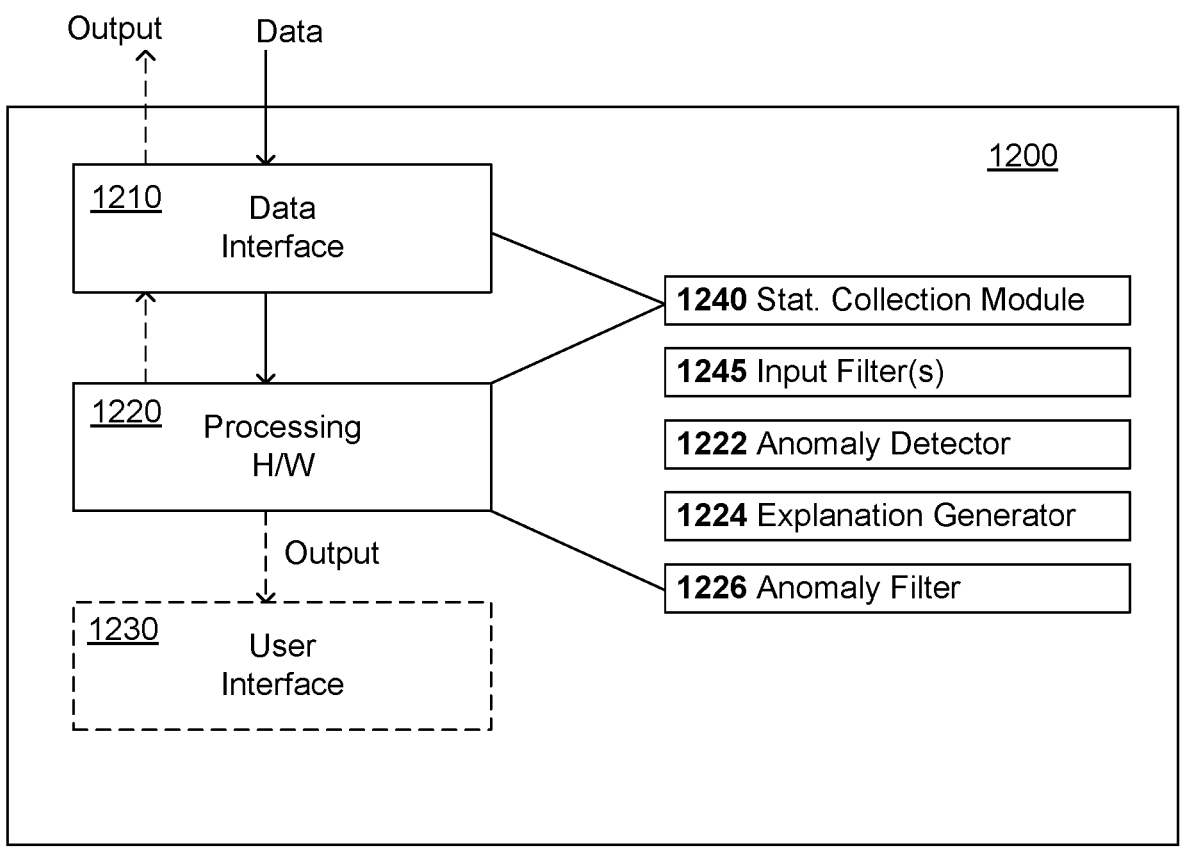
FIG. 12 illustrates an electronic device according to another embodiment of the present invention.

FIG. 12 illustrates an electronic device 1200 according to another embodiment of the present invention. The electronic device includes a data interface 1210, processing hardware 1220, and optionally another data interface or user interface 1230. The processing hardware can include an anomaly detector 1222, an explanation generator 1224, and optionally an anomaly filter 1226. The anomaly detector 1222 performs the same functions of the anomaly detector 110 of FIGS. 1, 7 and 8, or the anomaly detector 910 of FIG. 9, for example. The explanation generator 1224 performs the same functions of the explanation generator 120 of FIGS. 1, 7 and 8, or the explanation generator 920 of FIG. 9, for example. The anomaly filter 1226 performs the same functions of the anomaly filter 130 of FIGS. 1, 7 and 8, or the anomaly filter 930 of FIG. 9, for example. The data interface 1210, the processing hardware 1220, or a combination thereof, can further include a statistics collection module 1240. The statistics collection module 715 interfaces with the computer system 710 to collect data (e.g. performance metadata) therefrom. This data is collected and possibly stored or organized so that it can be passed onward for further processing. The statistics collection module may be implemented by a computer processor executing program instructions stored in memory, for example. The processing hardware 1220 can further include one or more input filters 1245, such as Kalman filters. The data interface 1210 can be a serial or parallel data interface or a network port, or an interface using a computer file system or internal computer data bus, or the like. The processing hardware 1220 can include a computer processor executing program instructions stored in memory, or hardware processing components, or both. The user interface 1230 may include a visual display.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What is claimed is:

1. A method performed in an electronic device storing and executing program code, for computer system performance monitoring, wherein the electronic device comprises one or more of an electronic data processing hardware, a memory, a data interface, a user interface and a network interface, which are operatively coupled to perform functions of an anomaly detector, the method comprising:

obtaining performance metadata indicative of usage of one or more computing resources of the computer system, the performance metadata comprising a first series of values indexed in order against a corresponding series of reference values; wherein the anomaly detector receives the performance metadata as input;

detecting one or more anomaly transition point candidates in the metadata, each of the one or more anomaly transition point candidates indicative of a possible transition, of a process of the computer system generating the metadata, to or from an anomalous behavior mode, wherein each of the anomaly transition point candidates is a standalone transition point which is unpaired with other ones of the anomaly transition point candidates; and reporting one or more of the anomaly transition point candidates as anomaly transition points; wherein the anomaly detector generates either the anomaly transition point candidates or the anomaly transition points as output indicative of computer system performance;
wherein detecting the one or more anomaly transition point candidates comprises:
for each one of a plurality of the reference values:
determining a first average and a first variance for a portion of the first series of values which corresponds to two or more of the reference values which lie within a predetermined interval immediately preceding said one of the plurality of reference values;
determining a second average and a second variance for another portion of the first series of values which corresponds to another two or more of the reference values which lie within another predetermined interval immediately following said one of the plurality of reference values;
determining a z-score of mean difference for said one of the plurality of reference values based on the first average, the second average, the first variance and the second variance, the z-score of mean difference indicative of a likelihood that said one of the plurality of reference values represents one of the anomaly transition points; and
identifying said one of the plurality of reference values as representing said one of the anomaly transition point candidates at least in part based on the z-score of mean difference.

2. The method of claim 1, further comprising, for at least one of the anomaly transition point candidates, generating an explanatory predicate indicative of a human-readable explanation of behavior of the process at said at least one of the anomaly transition point candidates; wherein the electronic device is further configured to perform functions of an explanation generator, and the anomaly transition point candidates are received by the explanation generator as input and one or more explanatory predicates are generated by the explanation generator as output.

3. The method of claim 2, wherein the explanatory predicate is based on a difference between the first average and the second average.

4. The method of claim 2, wherein the explanatory predicate is based on a difference between the first average and the second average, and is further based on a difference between the third average and the fourth average.

5. The method of claim 2, further comprising:
for each one of the anomaly transition point candidates, generating the explanatory predicate when a likelihood that said one of the plurality of reference values represents one of the anomaly transition points exceeds a predetermined, adjustable threshold, and refraining from generating the explanatory predicate otherwise.

6. The method of claim 5, further comprising retaining said one of the anomaly transition point candidates for possible reporting as one of the anomaly transition points only when the explanatory predicate has been generated; wherein the electronic device is further configured to perform functions of an anomaly filter, and the retaining is based on the anomaly filter receiving the anomaly transition point candidates generated by the anomaly detector and the explanatory predicate generated by the explanation generator as input.

7. The method of claim 2, further comprising, for said at least one of the anomaly transition point candidates:
generating one or more further explanatory predicates indicative of further respective human-readable explanations of behavior of the process at said at least one of the anomaly transition point candidates; and
presenting, by the explanation generator, the explanatory predicate and the one or more further explanatory predicates in a decreasing order of likelihood or explanatory power.

8. The method of claim 1, wherein at least one of the following is a mean average:
the first average; and
the second average.

9. The method of claim 1, wherein the series of reference values is a series of timestamps at which corresponding ones of the first series of values occur.

10. The method of claim 1, wherein:
the performance metadata further comprises a second series of two or more values indexed in order against the series of reference values;
detecting the one or more anomaly transition point candidates further comprises:
for each one of the plurality of the reference values:
determining a third average and a third variance for a portion of the second series of values which corresponds to the reference values which lie within the predetermined interval immediately preceding said one of the plurality of reference values;
determining a fourth average and a fourth variance for another portion of the second series of values which corresponds to the reference values which lie within the other predetermined interval immediately following said one of the plurality of reference values;
determining a second z-score of mean difference for said one of the plurality of reference values based on the third average, the fourth average, the third variance and the fourth variance, the second z-score of mean difference indicative of another likelihood that said one of the plurality of reference values represents one of the anomaly transition points; and
identifying said one of the plurality of reference values as representing said one of the anomaly transition point candidates at least in part based on the z-score of mean difference and the second z-score of mean difference.

11. The method of claim 1, further comprising:
identifying two or more of the anomaly transition point candidates which correspond to reference values being within the predetermined interval or the other predetermined interval;
identifying one of the two or more anomaly transition point candidates having a highest likelihood of representing one of the anomaly transition points; and
retaining said identified one of the two or more anomaly transition point candidates for possible reporting as one of the anomaly transition points and removing each other of the two or more anomaly transition point candidates as possible ones of the anomaly transition points.

12. The method of claim 1, wherein the performance metadata is raw performance metadata or wherein the data is a filtered performance metadata obtained from said raw performance metadata.

13. The method of claim 1, further comprising adjusting one or more anomaly detection operating parameters in order to adjust a quantity of the reported anomaly transition points.

14. The method of claim 1, wherein the predetermined interval immediately preceding said one of the plurality of reference values has a same width or a different width than the other predetermined interval immediately following said one of the plurality of reference values.

15. The method of claim 1, further comprising:
generating, for each one of two or more of the anomaly transition points, an importance value indicative of extremeness of relative deviation of underlying portions of the performance metadata associated with said one of the two or more of the anomaly transition points; and
presenting, in said output indicative of computer system performance, said two or more of the anomaly transition points a decreasing order of said importance values.

16. A method performed in an electronic device storing and executing program code, for automatically detecting anomalies in performance metadata, wherein the electronic device comprises one or more of an electronic data processing hardware, a memory, a data interface, a user interface and a network interface, which are operatively coupled to perform functions of an anomaly detector, the method comprising:
detecting one or more anomaly transition point candidates in the performance metadata, the performance metadata comprising a first series of values indexed in order against a corresponding series of reference values, each of the one or more anomaly transition point candidates indicative of a possible transition, of a process generating the performance metadata, to or from an anomalous behavior mode, wherein each of the anomaly transition point candidates is a standalone transition point which is unpaired with other ones of the anomaly transition point candidates; and
reporting one or more of the anomaly transition point candidates as anomaly transition points;
wherein the anomaly detector receives the performance metadata as input, and generate either the anomaly transition point candidates or the anomaly transition points as output indicative of computer system performance; and
detecting the one or more anomaly transition point candidates comprises:
for each one of a plurality of the reference values:
determining a first average and a first variance for a portion of the first series of values which corresponds to two or more of the reference values which lie within a predetermined interval immediately preceding said one of the plurality of reference values;
determining a second average and a second variance for another portion of the first series of values which corresponds to another two or more of the reference values which lie within another predetermined interval immediately following said one of the plurality of reference values;
determining a z-score of mean difference for said one of the plurality of reference values based on the first average, the second average, the first variance and the second variance, the z-score of mean difference indicative of a likelihood that said one of the plurality of reference values represents one of the anomaly transition points; and
identifying said one of the plurality of reference values as representing said one of the anomaly transition point candidates at least in part based on the z-score of mean difference.

17. The method of claim 16, further comprising, for at least one of the anomaly transition point candidates, generating an explanatory predicate indicative of a human-readable explanation of behavior of the process at said at least one of the anomaly transition point candidates; wherein the electronic device is further configured to perform functions of an explanation generator, and the anomaly transition point candidates are received by the explanation generator as input and one or more explanatory predicates are generated by the explanation generator as output.

18. An electronic device storing and executing program code for automatically detecting anomalies in performance metadata, the electronic device comprising one or more of an electronic data processing hardware, a memory, a data interface, a user interface and a network interface, which are operatively coupled to perform functions of an anomaly detector and the electronic device being configured to:
receive the performance metadata using the data interface, the performance metadata comprising a first series of values indexed in order against a corresponding series of reference values; wherein the anomaly detector receives the performance metadata as input;
detect, using the electronic data processing hardware, one or more anomaly transition point candidates in the performance metadata, each of the one or more anomaly transition point candidates indicative of a possible transition, of a process generating the performance metadata, to or from an anomalous behavior mode, wherein each of the anomaly transition point candidates is a standalone transition point which is unpaired with other ones of the anomaly transition point candidates; and report, using the data interface or another data or user interface, one or more of the anomaly transition point candidates as anomaly transition points; wherein the anomaly detector generates either the anomaly transition point candidates or the anomaly transition points as output indicative of computer system performance;
wherein detecting the one or more anomaly transition point candidates comprises:
for each one of a plurality of the reference values:
determining a first average and a first variance for a portion of the first series of values which corresponds to two or more of the reference values which lie within a predetermined interval immediately preceding said one of the plurality of reference values;
determining a second average and a second variance for another portion of the first series of values which corresponds to another two or more of the reference values which lie within another predetermined interval immediately following said one of the plurality of reference values;
determining a z-score of mean difference for said one of the plurality of reference values based on the first average, the second average, the first variance and the second variance, the z-score of mean difference indicative of a likelihood that said one of the plurality of reference values represents one of the anomaly transition points; and
identifying said one of the plurality of reference values as representing said one of the anomaly transition point candidates at least in part based on the z-score of mean difference.

19. The electronic device of claim 18, further configured to: for at least one of the anomaly transition point candidates, generate, using the electronic data processing hardware, an explanatory predicate indicative of a human-readable explanation of behavior of the process at said at least one of the anomaly transition point candidates; wherein the electronic data processing hardware comprises an explanation generator, and the anomaly transition point candidates are received by the explanation generator as input and one or more explanatory predicates are generated by the explanation generator as output.

20. The electronic device of claim 19, further configured, for said at least one of the anomaly transition point candidates, to:
   generate one or more further explanatory predicates indicative of further respective human-readable explanations of behavior of the process at said at least one of the anomaly transition point candidates; and
   present, by the explanation generator, the explanatory predicate and the one or more further explanatory predicates in a decreasing order of likelihood or explanatory power.

21. The electronic device of claim 18, wherein at least one of the following is a mean average:
   the first average; and
   the second average.

22. The electronic device of claim 18, further configured to:
   generate, for each one of two or more of the anomaly transition points, an importance value indicative of extremeness of relative deviation of underlying portions of the performance metadata associated with said one of the two or more of the anomaly transition points; and
   present, in said output indicative of computer system performance, said two or more of the anomaly transition points in a decreasing order of said importance values.

\* \* \* \* \*